United States Patent [19]

Hamachi et al.

[11] Patent Number: 5,006,940
[45] Date of Patent: Apr. 9, 1991

[54] AUTOMATIC CHANGER FOR DIGITAL AUDIO CASSETTE TAPE PLAYER

[75] Inventors: Hishashi Hamachi; Tamotsu Harada, both of Saitama, Japan

[73] Assignee: Pioneer Electronic Corporation, Tokyo, Japan

[21] Appl. No.: 251,618

[22] Filed: Sep. 30, 1988

[30] Foreign Application Priority Data

Sep. 30, 1987 [JP] Japan .................. 62-244405

[51] Int. Cl.$^5$ ............................. G11B 15/68
[52] U.S. Cl. ........................ 360/92; 369/34; 369/75.1
[58] Field of Search .......... 360/91, 92, 98.04, 98.05, 360/98.06; 369/30, 34–35, 75.1

[56] References Cited

U.S. PATENT DOCUMENTS

| 3,431,367 | 3/1969 | Nickl ................. | 364/92 |
| 3,836,154 | 9/1974 | Ishikawa ............. | 360/92 |
| 4,075,669 | 2/1978 | Louzil et al. ........ | 360/92 |
| 4,682,313 | 7/1987 | Miyake .............. | 369/39 |

FOREIGN PATENT DOCUMENTS 2206556 11/1973 France .
2578676 3/1986 France .

OTHER PUBLICATIONS

Patent Abstracts of Japan, vol. 9, No. 68 (P-344) (1791) 1985, & JP-A-59-201263 (1984).
Patent Abstracts of Japan, vol. 4, No. 86 (P-16(568) 1980, & JP-A-55-48861 (1980).
Patent Abstracts of Japan, vol. 10, No. 68 (P-437) (2125) 1986, & JP-A-60-205853 (1985).

Primary Examiner—David J. Severin
Attorney, Agent, or Firm—Sughrue, Mion, Zinn, Macpeak & Seas

[57] ABSTRACT

An automatic changer for a digital audio cassette tape player is disclosed which comprises holders for holding tape cassettes inserted into insertion openings with lids of the cassettes being located inwardly so that labels on backs of said cassettes can be seen from a front side of said player, a plurality of support members for supporting the holders, respectively, a conveyor for picking up selectively one of the plurality of support members, separating the support member away from the holder, and setting the tape cassette to a tape travelling mechanism with the tape cassette being held by said holder; and a motor for driving the conveyor.

7 Claims, 35 Drawing Sheets

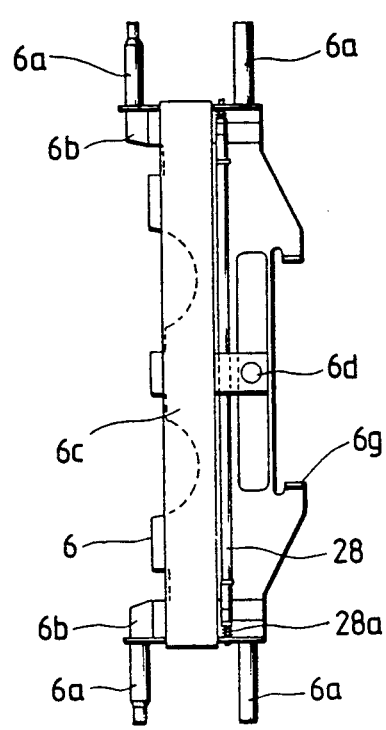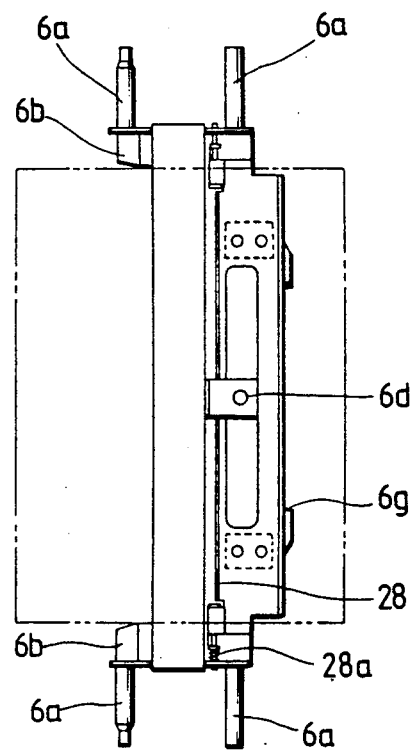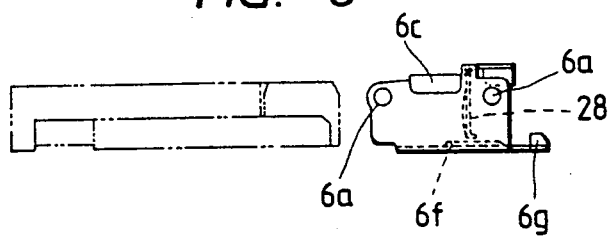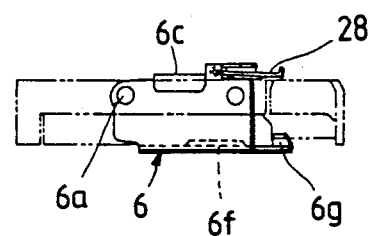

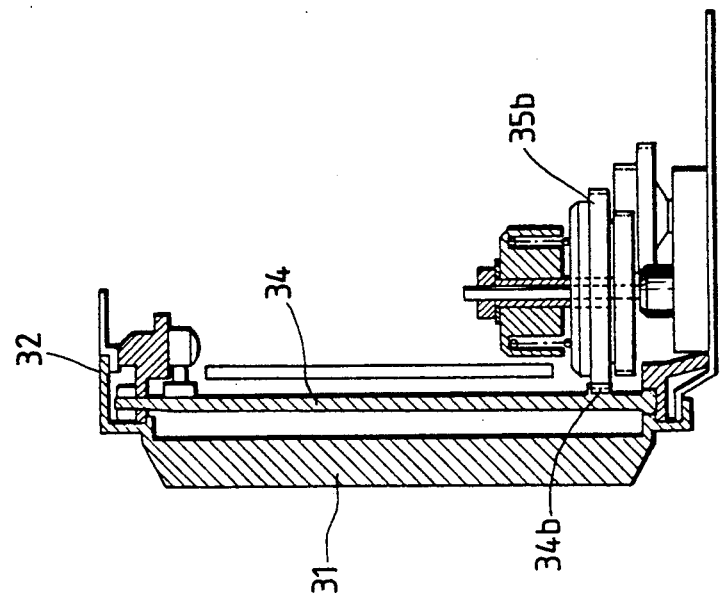
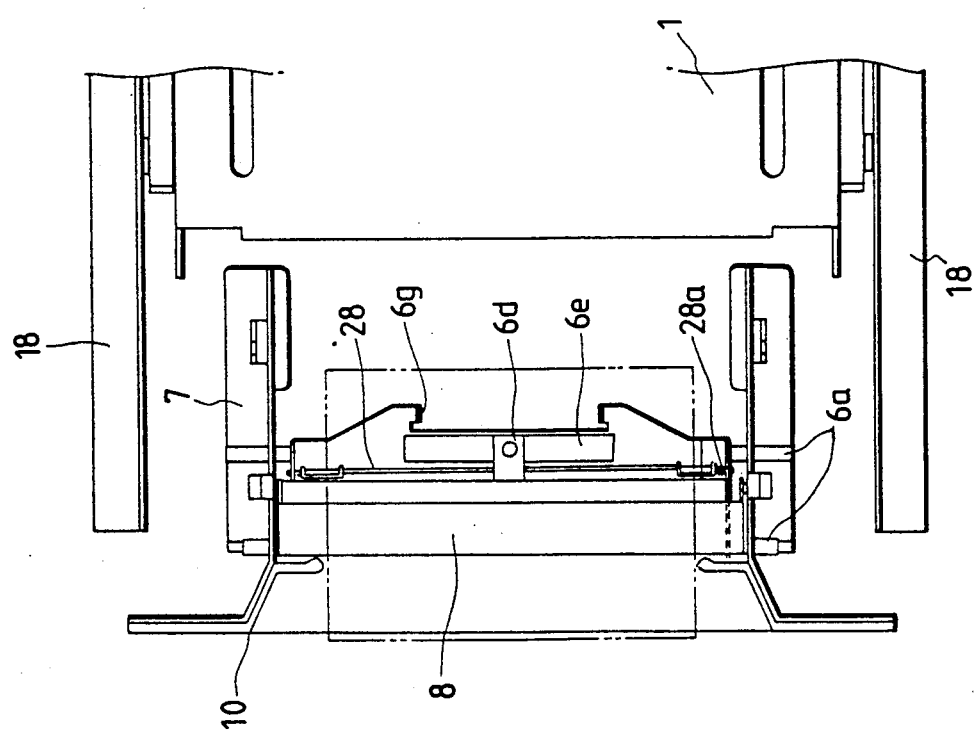

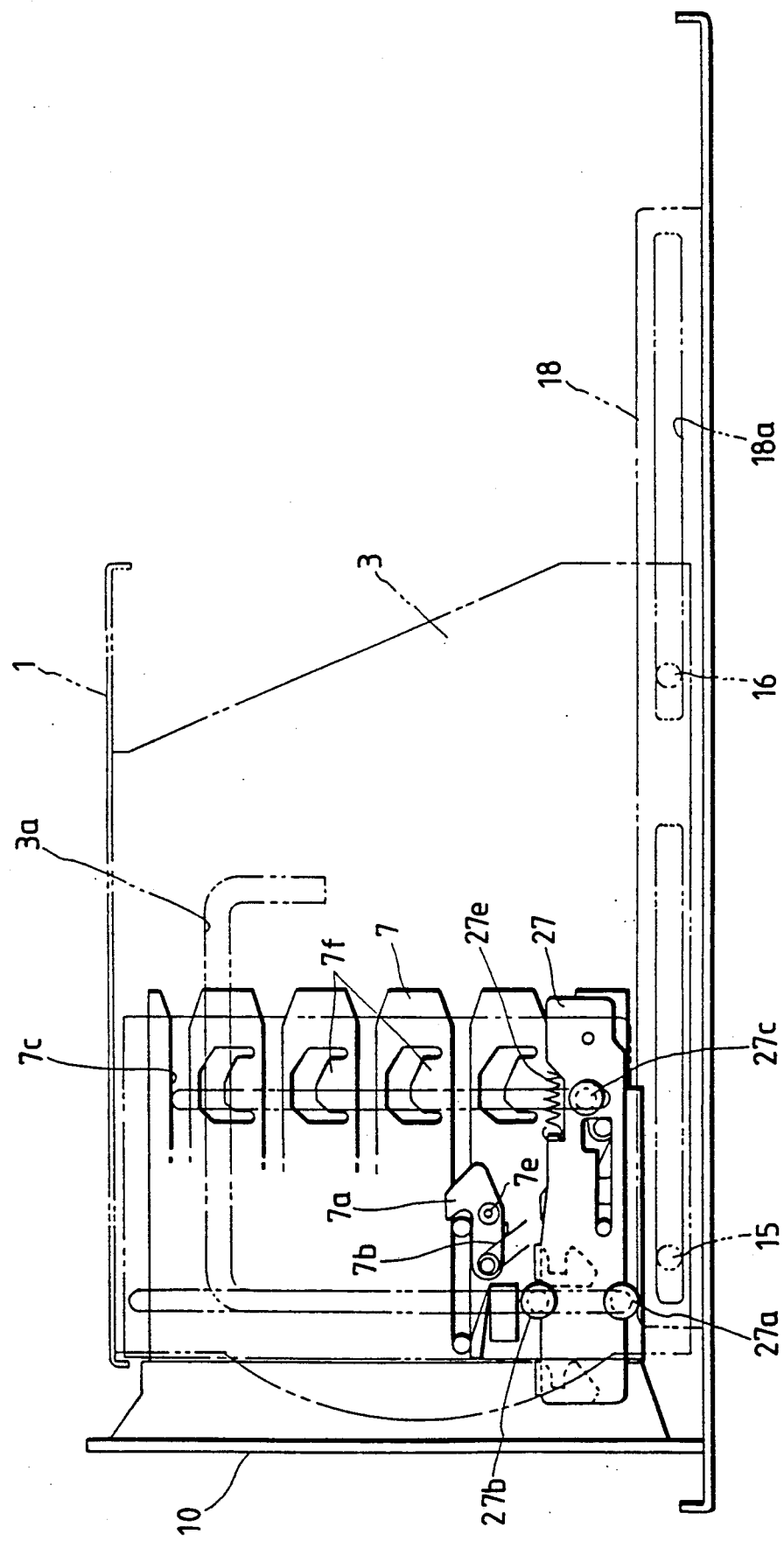

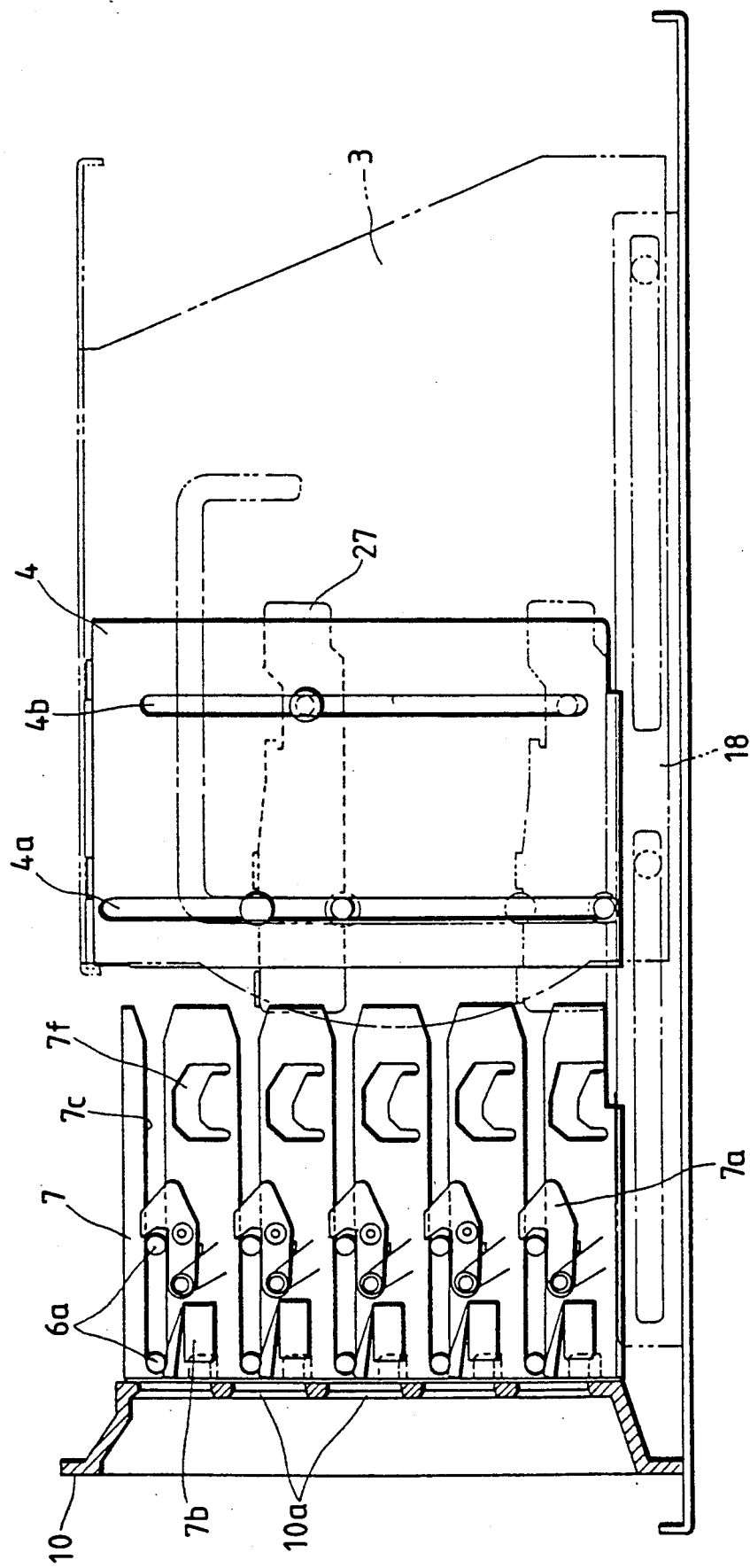

AUTOMATIC CHANGER FOR DIGITAL AUDIO CASSETTE TAPE PLAYER

BACKGROUND OF THE INVENTION

The present invention relates to an automatic changer for a digital audio cassette tape player in which a plurality of digital audio tape cassettes, each of which has a cassette lid for covering a tape running surface and has a cassette slider which covers tape reel holes and keeps the cassette lid from opening, can be loaded so that optional ones of the cassettes can be played.

As for each of conventional automatic changers for analog and digital audio cassette tape players, a plurality of tape cassettes are loaded in a magazine which is set in the tape player so that optional ones of the tape cassettes can be set on the playback mechanism of the tape player and played.

Since the conventional automatic changers function so that the magazine in which the tape cassettes are loaded is set in the tape player, the loaded tape cassettes are invisible unless the magazine is taken out of the tape player. For that reason, only the human memory is dependable for the recognition or the like of the contents of the tape cassettes loaded in the magazine set in the tape player.

Since the magazine needs to be taken out of the tape player when the loaded tape cassette is to be replaced with another one, the playback of the other loaded tape cassette needs to be stopped for the replacement.

SUMMARY OF THE INVENTION

The present invention was made in order to solve the above-mentioned problems of the conventional automatic changers.

Accordingly, it is an object of the present invention to make it possible to always recognize the contents of loaded tape cassettes, by loading them in a cassette tape player, without using a magazine, to render labels on the backs of the cassettes visible from outside.

It is another object of the present invention to make it possible to replace each of loaded tape cassettes with another one without stopping the playback of each of the other loaded tape cassettes.

It is yet another object of the present invention to make a cassette tape player compact by not using a magazine.

It is yet another object of the present invention to simplify a mechanism for causing the slider of a tape cassette to slide to expose tape reel holes, unlock the lid of the tape cassette and move the slider thereof, along with the loading of the tape cassette.

It is yet another object of the present invention to perform precise control and prevent a trouble due to a power failure or the like, by using a detection means for detecting whether a means for holding a tape cassette is separated from a support means or returned thereto, to regulate the operation of a conveyance means.

These and other objects of the invention may be attained by a plurality of holding means for holding tape cassettes in such a state as to make labels on the backs of the cassettes visible, a conveyance means for selectively grasping one of the holding means and setting the grasped holding means on a tape running mechanism, and a drive means for operating the conveyance means.

According to the invention there is provided an automatic changer for a digital audio cassette tape player, comprising:
  a plurality of holding means for holding a tape cassettes, each cassette being inserted into an individual insertion opening with a lid of the tape cassette being located inwardly so that a label on each of the tape cassettes can be seen from a front side of the player;
  a plurality of support means for supporting said holding means, respectively;
  conveying means for picking up selectively one of said plurality of holding means, separating the one holding means away from the support means, and setting a tape cassette held in the one holding means onto a tape conveying mechanism with the tape cassette being held by the holding means; and
  moving unit drive means for driving the conveying means.

According to the invention there is provided an automatic changer for a digital audio cassette tape player, comprising:
  a plurality of holding means for holding a plurality of tape cassettes, each cassette being inserted into an individual insertion opening with a lid of the tape cassette being located inwardly so that a label on each of said tape cassettes can be seen from a front side of the player;
  a plurality of support means for supporting the holding means, respectively;
  conveying means for picking up selectively one of the plurality of holding means, separating said one holding means away from the support means, and setting a tape cassette held in said one holding means onto a tape conveying mechanism with the tape cassette being held by the holding means;
  detecting means for detecting a position where the holding means is separated from the support means, and a position where the holding means is returned back to the support means; and
  moving unit drive means for driving the conveying means in accordance with the detection of the detecting means.

According to the invention there is provided an automatic changer for a digital audio cassette tape player, comprising:
  holders for holding a tape cassette inserted into an insertion opening with lid of the cassette being located inwardly while sliding a cassette slider;
  guide groove means having lock levers for retaining guide pins of the holding means, the guide pins being inserted into the guide groove, means;
  cam means for effecting the lock levers, thereby releasing the engagement of the lock lever;
  catchers having engagement portions for engaging with the guide pins; and
  a loading arm engaged with a support shaft of the guide pin for moving the support shaft along a guide hole to thereby move the catcher.

According to the invention there is provided an automatic changer for a digital audio cassette tape player, comprising:
  holding means for holding a tape cassette inserted into an insertion opening;
  a plurality of guide groove means having an inlet/outlet opening tapered outwardly, guide pins of the holding means each being inserted into one of the guide groove means;

catchers each for one of the guide pins of the holding means;

a loading arm coupled to the catcher for moving the catcher in a direction perpendicular to the guide groove means;

a drive means including a motor for forming an idle movement in an axial direction of a worm for driving the loading arm and a biasing means for biasing the worm toward one side of the idle movement; and a moving means for moving the loading arm in parallel with the guide groove means.

According to the invention there is provided an automatic changer for a digital audio cassette tape player, comprising:

a plurality of arrayed insertion opening portions into which tape cassettes are to be inserted;

a loading means for positioning one of said tape cassette onto a cassette conveying means;

a door provided on a front surface of the insertion opening portions;

a detection switch means for being operated when the door has fully closed the insertion opening portions; and a control means for interrupting the operation of the loading means until the detection switch means detects the closing of the door.

According to the invention there is provided an automatic changer for a digital audio cassette tape player, comprising:

a plurality of holding means for holding a plurality of tape cassette inserted into an insertion opening;

a plurality of guide groove means into which each holding means is inserted;

catchers moving in a direction perpendicular to the guide groove means for gripping selected one of the holding means;

an arm coupled to the catcher for coupling a moving means for moving in parallel with the guide groove means and a gear with each other;

a cam cooperating with the gear; and a detection switch means for being operated by the cam.

According to the invention there is provided an automatic changer for a digital audio cassette tape player, comprising:

holder means provided on a rear side of a plurality of insertion openings into which tape cassettes are to be inserted, for holding the tape cassette;

a loading means for delivering the tape cassette held by the holding means onto a tape travelling mechanism;

a door provided at a front face of the plurality of insertion openings to open/close the insertion openings; and a plurality of pressers provided at the door for contacting a front face of the tape cassette, the plurality of pressers being biased toward the cassette.

According to the invention there is provided an automatic changer for a digital audio cassette tape player, comprising:

a plurality of insertion openings into which tape cassettes are to be inserted;

a loading means for selecting one of the tape cassettes inserted into the insertion openings and for setting the one cassette onto a cassette conveying means;

operation button means provided on a front face of the insertion openings for operating the player;

a front panel having a transparent plate through which indications of the player may be seen; and a door provided between the front panel and the insertion openings for sliding thereon and capable of closing the insertion openings.

According to the invention there is provided an automatic changer for a digital audio cassette tape player, comprising:

a plurality of holding means for holding in place a plurality of tape cassettes inserted from insertion openings;

guide means for supporting the holding means to be engageable or disengageable with the guide means;

catchers for conveying the holding means away from the guide means; and preventing members mounted on one side of the guide means for preventing the insertion of the cassette tape into the guide means.

According to the invention there is provided an automatic changer for a digital audio cassette tape player, comprising:

a plurality of holding means into which digital audio cassette tapes are inserted, the holding means being held in contact with cassette sliders provided on bottoms of the cassette tapes and having projections for sliding the cassette sliders;

lid plates pivotally supported at a top portion of each holding means and biased so as to project into an interior of each holding means; and biasing means mounted on the top portion of the holding means for depressing the cassette tape through lid plate raised by the cassette tape.

BRIEF DESCRIPTION OF THE DRAWINGS

FIG. 5 shows a plan view of the holder of the automatic changer;

FIG. 6 shows a plan view of the holder before the insertion of a cassette into it;

FIG. 7 shows a plan view of the holder at the time of the insertion of the cassette into it;

FIG. 8 shows a plan view of the holder at the time of the insertion of the cassette into it;

FIG. 9 shows a plan view of the holder and panel side plates of the automatic changer;

FIG. 14 shows a vertically sectional view of the door open/close mechanism;

FIG. 15 shows a side view of the automatic changer in the catcher stand-by state thereof;

FIG. 19, 20, 21, 22 and 23 show side views of the catcher in the process of cassette backward conveyance;

DESCRIPTION OF THE PREFERRED EMBODIMENTS

Figure 1:
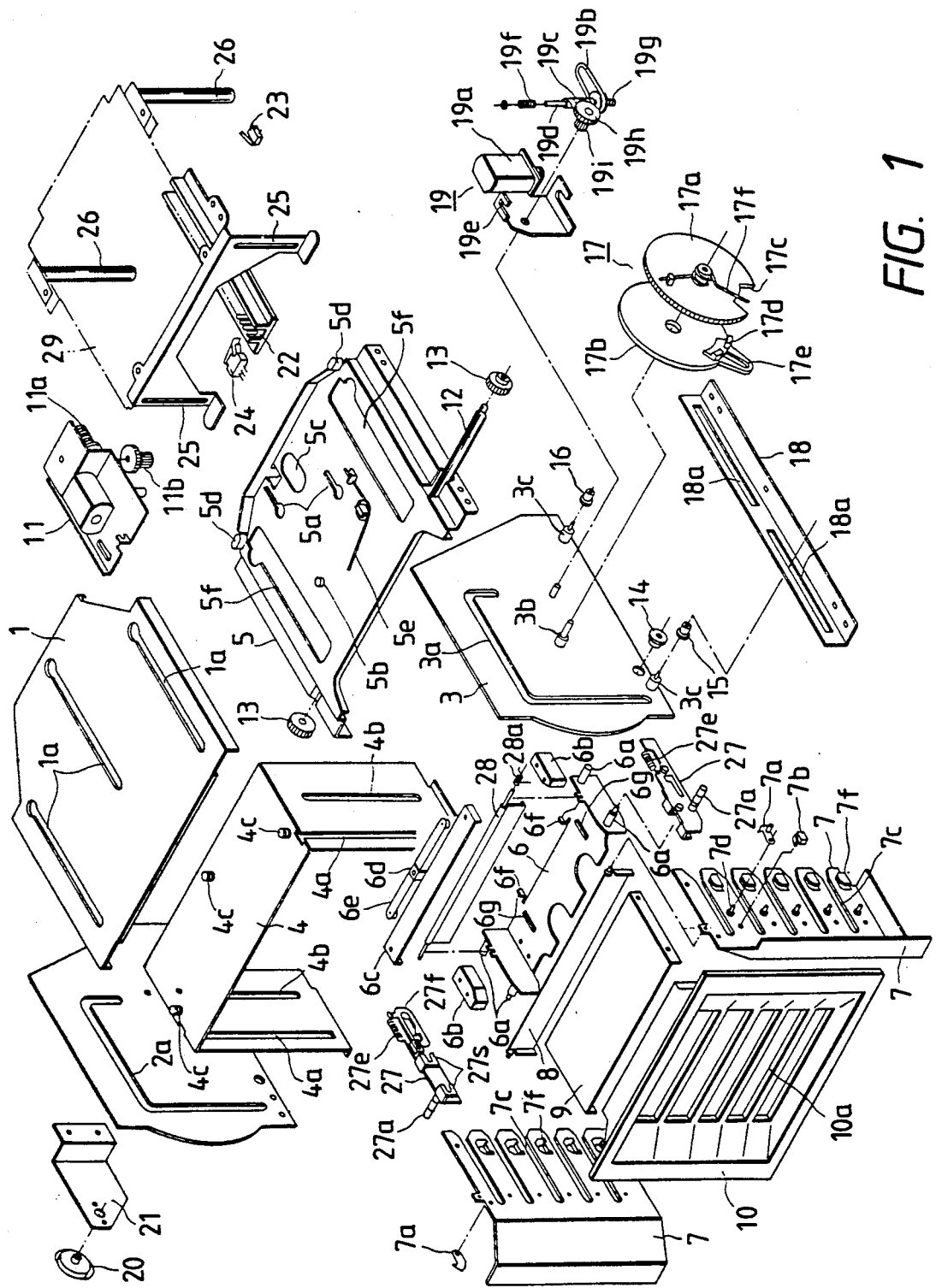
FIG. 1 shows an exploded perspective view of an automatic changer which is an embodiment of the present invention.

An embodiment of the present invention, which is an automatic changer for a digital analog cassette tape player, is hereafter described with reference to FIGS. 1 through 43. In the embodiment, a top plate 1 is provided with three guide holes 1a extending in the front-to-rear direction of the top plate. Side plates 2 and 3 having L-shaped guide holes 2a and 3a are secured to the right and left sides of the top plate 1 by screws. A base plate 5 is secured at both the sides thereof to the bottoms of the side plates 2 and 3 by screws. The top plate 1, the side plates 2 and 3 and the base plate 5 constitute a frame whose front form is quandrangular.

Figure 3:
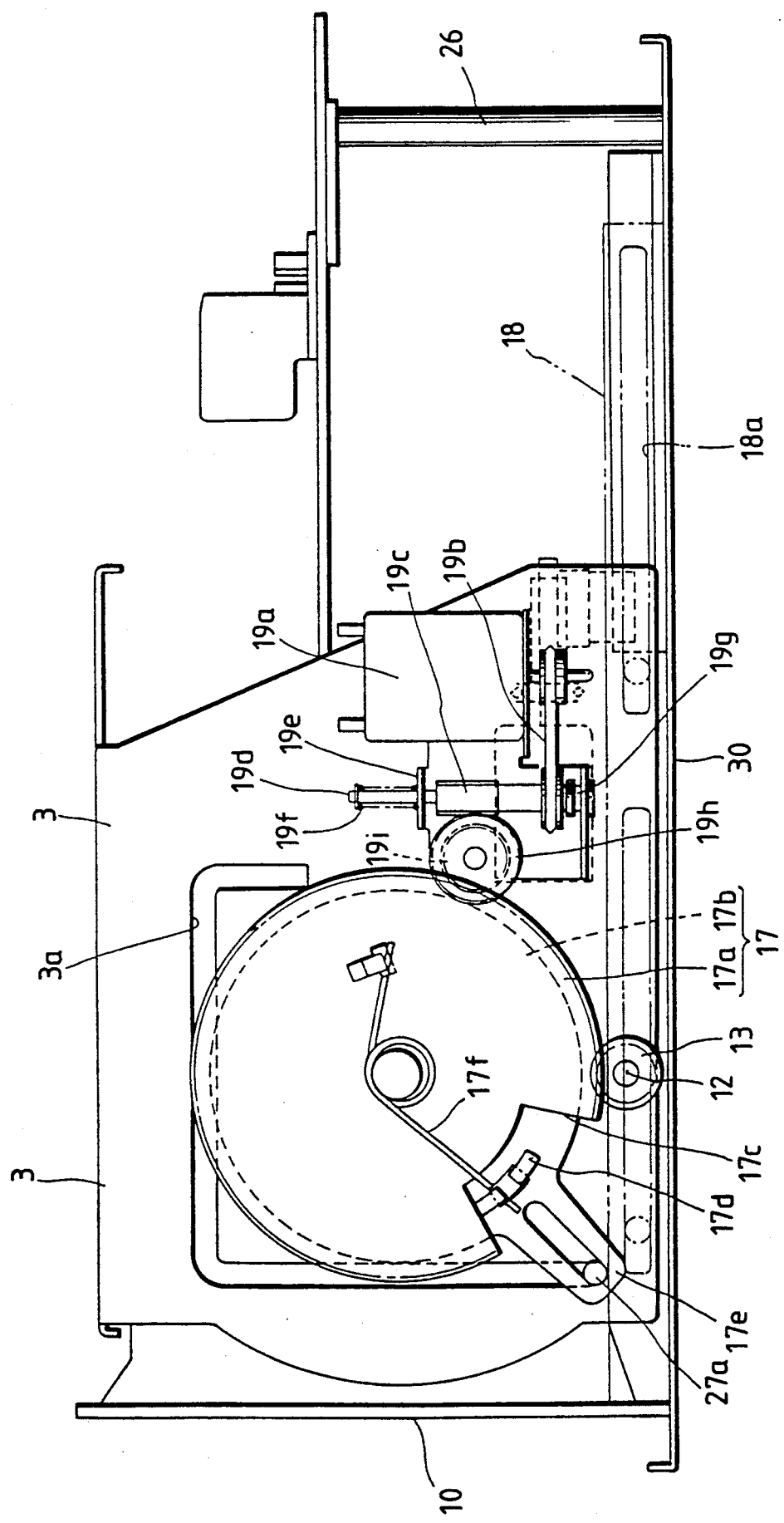
FIG. 3 shows a side view of the automatic changer.
Figure 4:
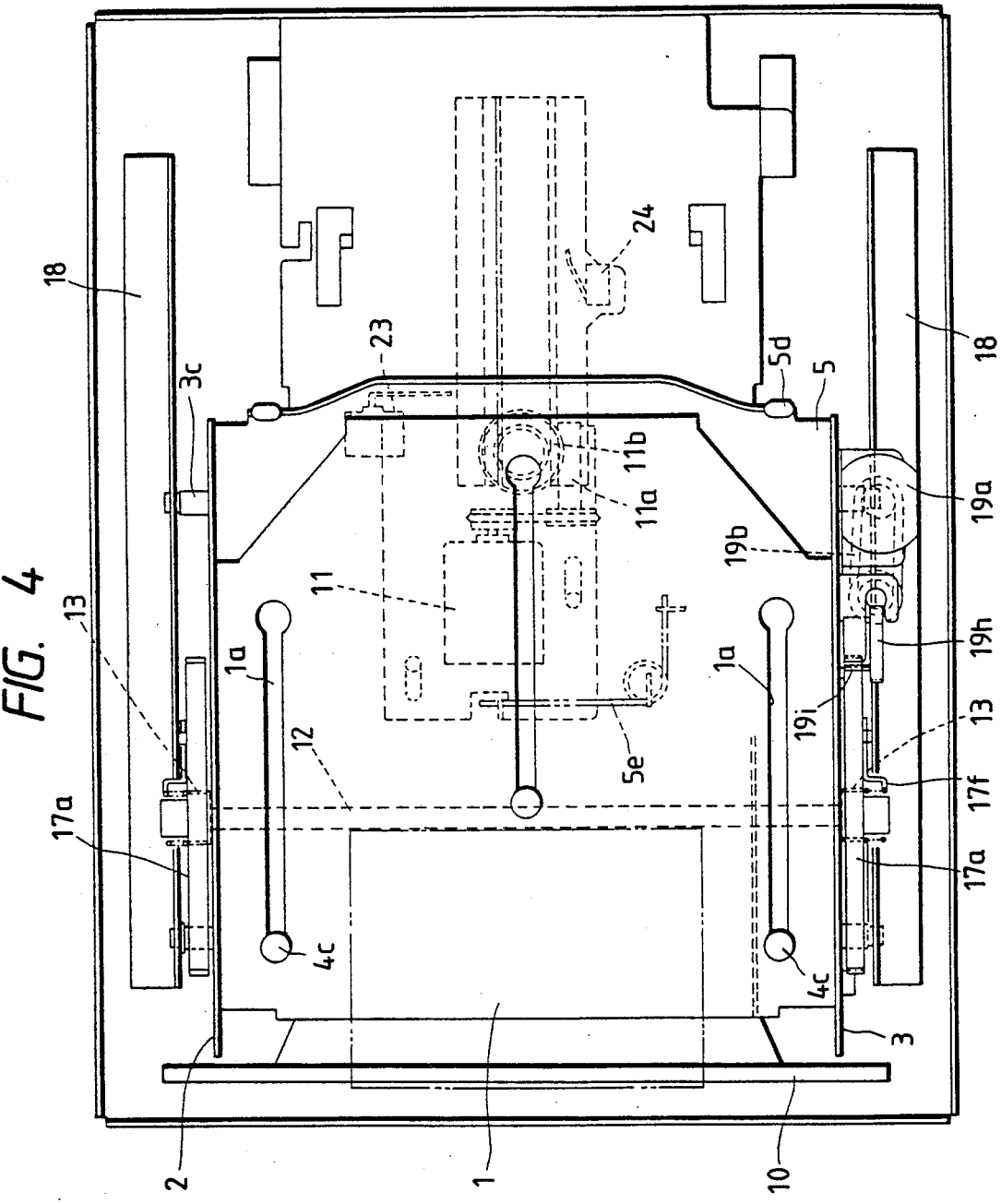
FIG. 4 shows a plan view of the automatic changer.

Two shafts 3c are provided on each of the side plates 2 and 3. Rollers 15 and 16 are rotatably fitted on the shafts 3c, and inserted into the guide holes 18a of rails 18 attached to a bottom plate 30 as shown in FIG. 3, so that the frame is comprised of the top plate 1, the side plates 2 and 3 and the base plate 5 and is movable backward and forward.

Three guide pins 4c are provided on the top of a slide plate 4 and slidably fitted in the guide holes 1a of the top plate 1 so that the slide plate is slidable backward and forward. Guide holes 4a and 4b are provided in the right and left sides of the slide plate 4.

The base plate 5 is provided with guide holes 5a and fitted with a guide pin 5b. A drive unit 11 is attached to the base plate 5 so that the drive unit can be moved backward and forward. A gear 11b engaged with a worm 11a, which is driven by a drive mechanism provided in the drive unit 11 is attached to the base plate 5 so that the drive unit can be moved backward and forward. A gear 11b engaged with a worm 11a, which is driven by a drive mechanism provided in the drive unit 11 and composed of a motor, a belt and so forth, projects down through the hole 5c of the base plate 5. The drive unit 11 is urged forward by a spring 5e. Stoppers 5d coated with rubber are set up on the right and left portions of the rear of the base plate 5.

A coupling shaft 12 extends through the lower portion of the base plate 5 and is supported by metal washers 14 attached to the side plates 2 and 3. Coupling gears 13 are secured to both the ends of the coupling shaft 12.

A mover 17 is composed of a moving gear 17a and a moving plate 17b. A pair of such movers 17 are supported by shafts 3b provided on the side plates 2 and 3. The moving gears 17a of the movers 17 are engaged with the coupling gears 13 so that the right and the left movers are rotated synchronously with each other. A projection 17d is provided on each moving plate 17b at the rear end of the guide hole 17e thereof and fitted in the notch 17c of the moving gear 17a. A spring 17f is provided between the moving gear 17a and the moving plate 17b and urges the projection 17d so that the projection is in pressure contact with the moving plate at one end of the notch 17e.

The torque of the motor 19a of a moving unit drives means 19 is transmitted to a worm 19c through a belt 19b. The shaft 19d of the worm 19c projects over a shaft support 19e. A spring 19f is provided between the top of the shaft 19d and the shaft support 19e and urges the shaft upward. A limit ring 19g is attached to the bottom of the shaft 19d so that the range of vertical movement of the shaft is limited by a bearing for the limit ring. The worm 19c is engaged with a gear 19h. An intermediate gear 19i secured to the gear 19h is engaged with the moving gear 17a of the mover 17 to drive the mover by the torque of the motor 19a. The moving unit 19 is attached to the side plate 3.

A rotary encoder 20 is attached to the side plate 2 by an encoder holder 21 coaxially with the mover 17 and engaged with the moving gear 17a thereof so that the encoder is driven along with the rotation of the mover and detects the rotative angle thereof.

Figure 2:
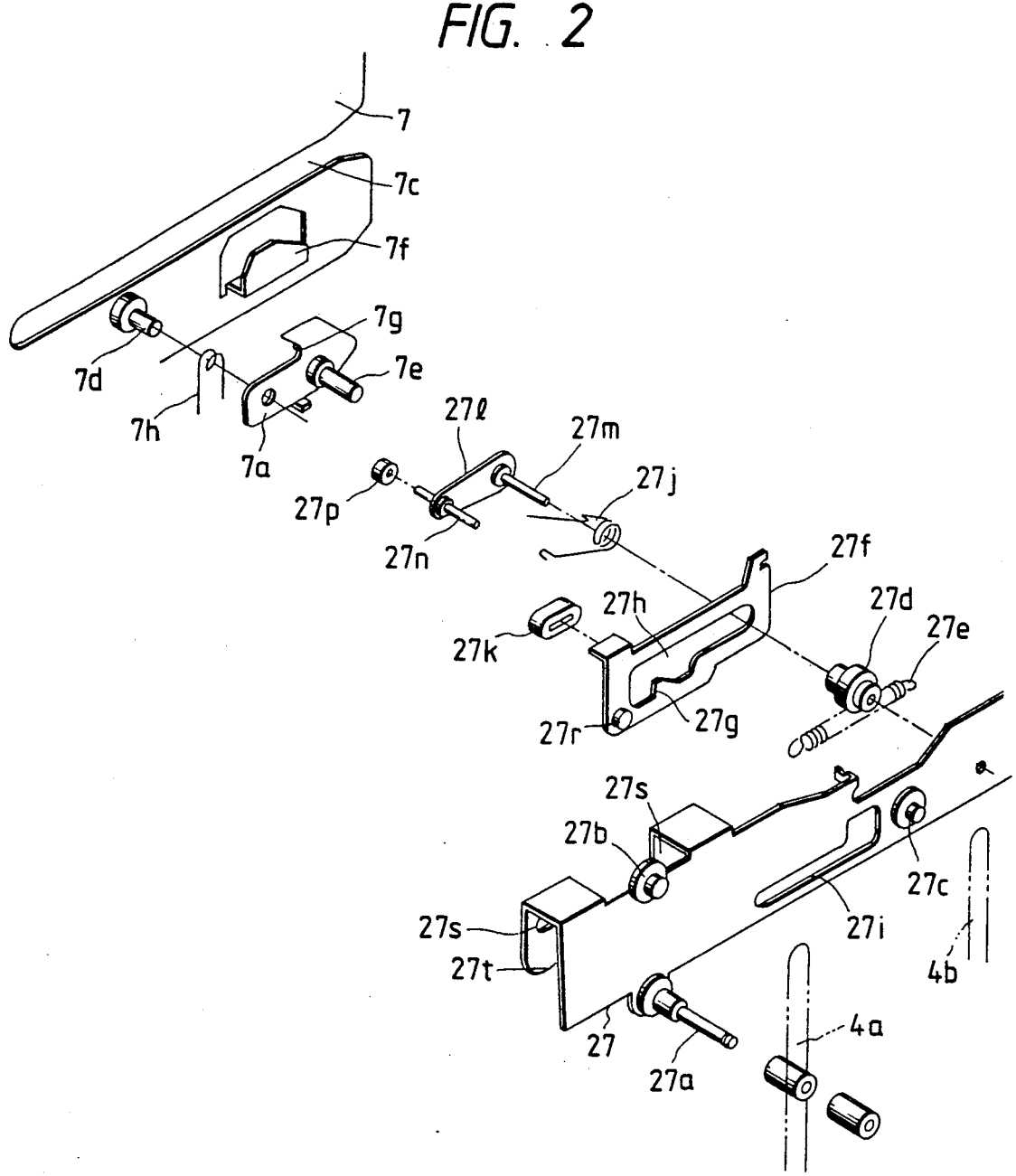
FIG. 2 shows an exploded perspective view of the catcher of the automatic changer.

A pair of right and left catchers 27 include shafts 27a, 27b and 27c, as shown in FIGS. 1 and 2. The shafts 27a and 27b are inserted into the guide holes 4a of the slide plate 4 and the shafts 27c are inserted into the other guide holes 4b thereof so that the shafts are slidable up and down. The shafts 27a of the right and the left catchers 27 are inserted into the guide holes 2a and 3a of the side plates 2 and 3 and the guide holes 17e of the movers 17 to move the catchers vertically as to the guide holes 5 and to move the catchers along the forms of the guide holes 3a. In each catcher 27, a bushing 27d is slidably fitted in the guide hole 27h of an auxiliary catcher 27f and the pin 27r of the auxiliary catcher is slidably fitted in a guide hole 27i, as shown in FIG. 2, so that the auxiliary catcher is supported slidably backward and forward. A spring 27e is provided between the auxiliary catcher 27f and the body of the catcher 27 and urges the auxiliary catcher forward. A shaft 27m on a locking lever 27 is rotatably inserted into the bushing 27d. A pin 27n on the locking lever 27 is urged downward by a spring 27j provided between the locking lever and the auxiliary catcher 27f. A roller 27p is fitted on a portion of the pin 27n whose other portion is inserted into the guide hole 27h of the auxiliary catcher 27f which has a stopper 27g provided at the guide hole so as to be engaged with the pin to the front of the auxiliary catcher 27f.

A rack 22 shown in FIG. 1 is attached to the bottom plate 30 and engaged with the drive gear 11b of the drive unit 11 attached to the base plate 5, so that the base plate, the side plates 2 and 3, the top plate 1, the slide plate 4 and the catchers 27 are moved backward or forward when the motor of the drive unit is rotated.

Figure 29:
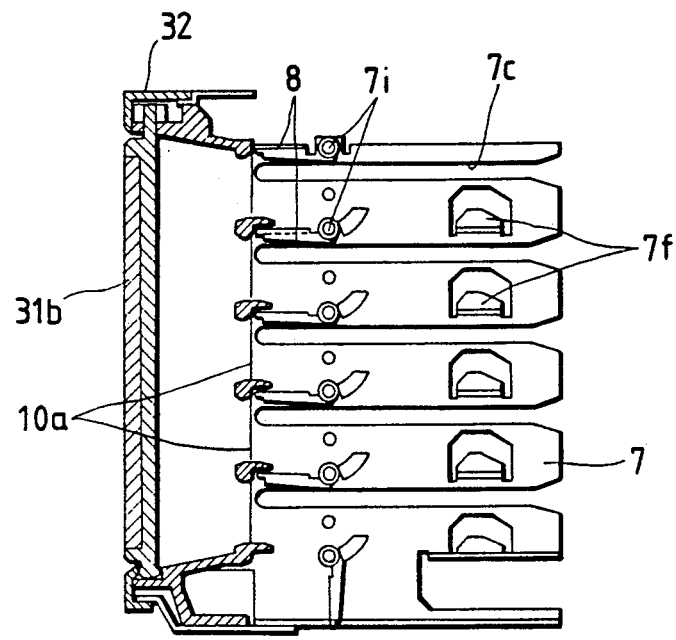
FIG. 29 shows a sectional view for describing the relationship between the door and panel side plate of the automatic changer.
Figure 30:
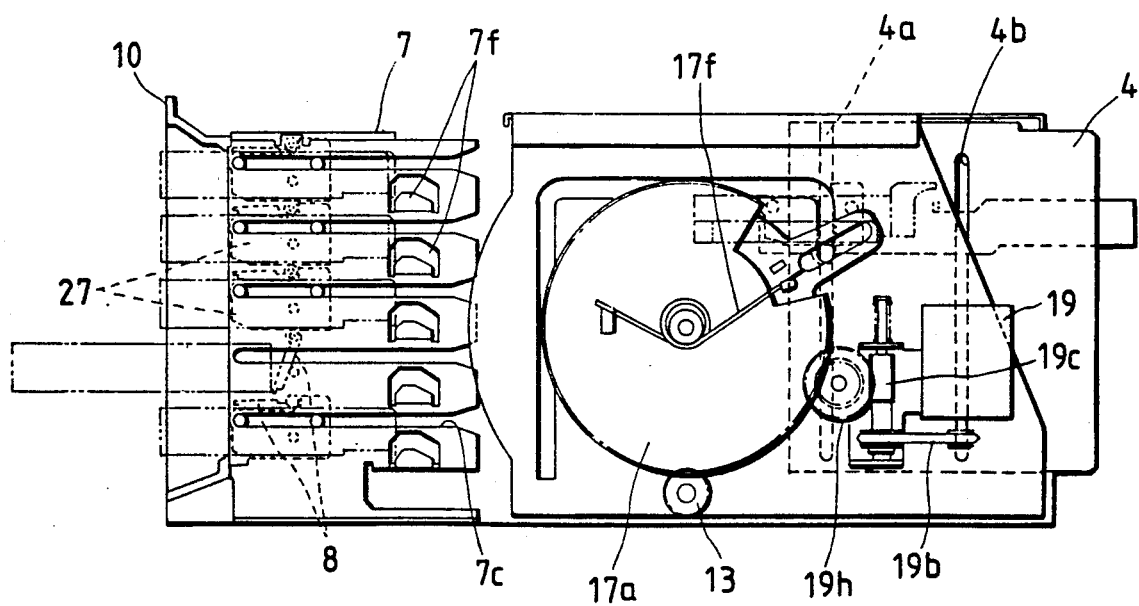
FIG. 30 shows a side view of the automatic changer with a cassette being inserted to a position in which another cassette being played was.

A plastic panel 10 has five insertion openings 10a located at vertical intervals so that cassettes are horizontally inserted through the openings. Support or guide means in the form of side plates 7 are attached to the right and left portions of the rear of the plastic panel 10. As shown in FIGS. 1 and 2, each of the panel side plates 7 has five horizontal guide slits 7c at vertical intervals and is provided with shafts 7d under the slits, respectively. Locking levers 7a are rotatably supported by the shafts 7d. Pins 7e are provided on the locking levers 7a near the tips thereof. The locking levers 7a have stoppers 7g at the tips of the levers. A spring 7h is wound on each shaft 7d between the locking lever 7a and the panel side plate 7 and urges the stopper 7g upward. Each of the panel side plates 7 has a cam surface 7f under each guide slit 7c. The cam surface 7f is in contact with the roller 27p on the locking lever 27 . Detection switches 7b are attached to one of the panel side plates 7 at the guide slits 7c. The tops of the panel side plates 7 are attached to an upper plate 9 and firmly held. As shown in FIGS. 29, 30, shafts 7i project from the inside surfaces of the right and the left panel side plates 7 over the guide slits 7c. Blocking plates 8 for preventing the too deep insertion of the cassettes are rotatably supported by the shafts 7i.

Shown at 6 in FIG. 1 is a holding means in the form of a holder, from each of the right and left sides of which two guide pins 6a extend. The guide pins 6a are inserted into the guide slits 7c of the panel side plates 7 forward. Five such holders 6 are thus supported at the guide slits 7c of the panel side plates 7. The guide pins 6a are engaged with the stoppers 7g of the locking levers 7a urged upward. The blocking plates 8 are pushed up by the holders 6 as shown in FIG. 30 except for the second lowermost blocking plate, for example, so that the cassettes can be inserted into the holders. In that state, the guide pins 6a push the detection switches 7b, as shown in FIG. 23, to determine whether the holders 6 are inserted in the guide slits 7c.

Projections 6g and 6f are provided on the lower portion of each of the holders 6. When the cassette is inserted into the holder 6 from the front thereof, the projections 6g unlock the slider of the cassette and the other projections 6f push and move the cassette slider to make it possible to open the lid (not shown in the drawings) of the cassette.

As shown in FIGS. 17, 19, 20, 21 and 22, the catchers 27 are provided with engaging portions 27s, into which the guide pins 6a are engaged, and cams 27t for pushing down the pins 7e.

The rubber stoppers 27k of the auxiliary catchers 27f act to push the guide pins 6a into the engaging portions 27s as the auxiliary catchers 27f are moved relative to the catchers 27.

As shown in FIGS. 5, 6, 7, 8 and 9, the tops of side plates 6b are secured to the body of the holder 6 to guide the cassette at the right and left sides thereof when the cassette is inserted into the holder, are coupled to each other by a coupling plate 6c so that the holder is shaped as a box. A lid plate 28 is supported at the tops of both the sides of the holder 6 and urged by a spring 28a so that the lid plate is in a vertical posture. An arm 6d projecting from the coupling plate 6c is fitted with a spring plate 6e bent downward at both the ends thereof. When the cassette is inserted into the holder 6 as shown in FIG. 8, the cassette pushes and opens the lid plate 28. At that time, the lid plate 28 pushes the cassette downward by the urging action of the spring plate 6e to surely put the cassette in contact with the projections 6g and 6f to surely cause the cassette slider to slide due to the insertion of the cassette.

Shown at 29 in FIG. 1 is a mechanical unit provided with an opener for opening the cassette lid, a cassette driver for driving the cassette, and so forth. The mechanical unit 29 is attached to support shafts 26 coupled to the bottom plate 30 and is also attached to the top of a stay 25 coupled to the bottom plate through the holes 5f of the base plate 5. As a result, the base plate 5 is moved backward and forward under the mechanical unit 29, and the top plate 1 is moved backward and forward over the mechanical unit.

Shown at 28 and 24 in FIG. 1 are detection switches attached to the bottom plate 30 at both the sides of the rack 22 so as to detect the position of the base plate 5 moved backward or forward through the engagement thereof with the rack.

Figure 10:
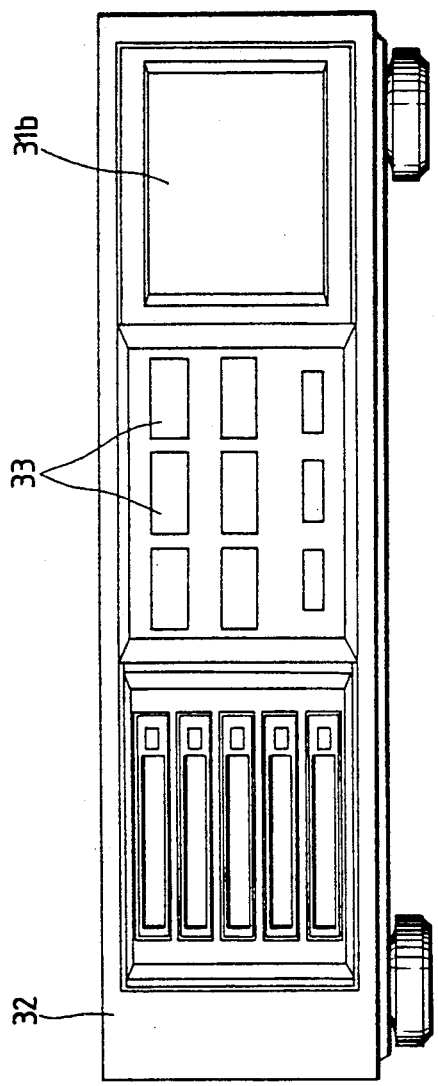
FIG. 10 shows a front view of a tape player with a door open.
Figure 11:
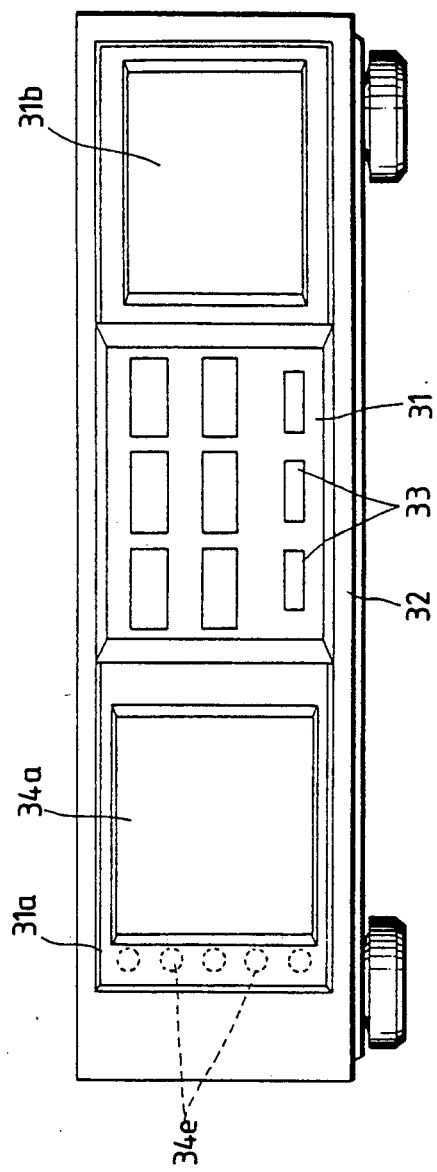
FIG. 11 shows a front view of the tape player with the door closed.
Figure 12:
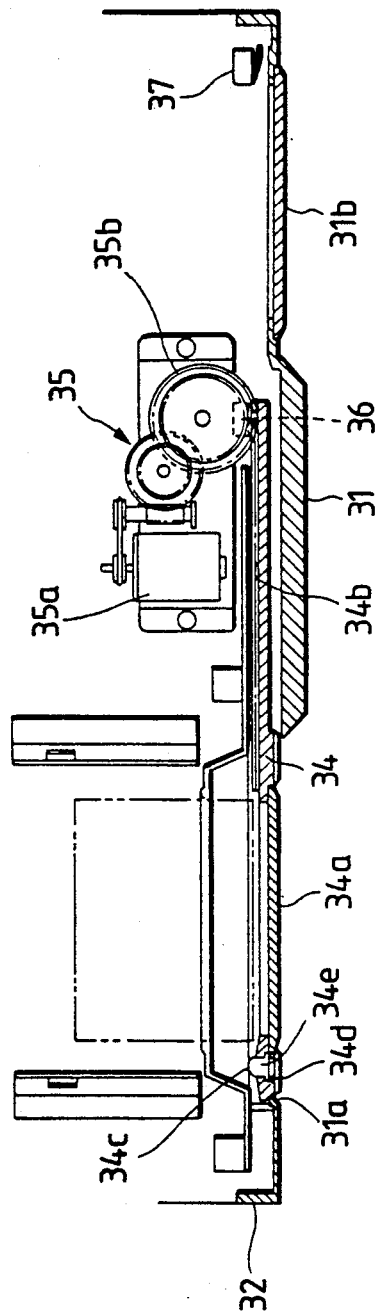
FIG. 12 shows a horizontally sectional view of the door open/close mechanism of the automatic changer.
Figure 13:
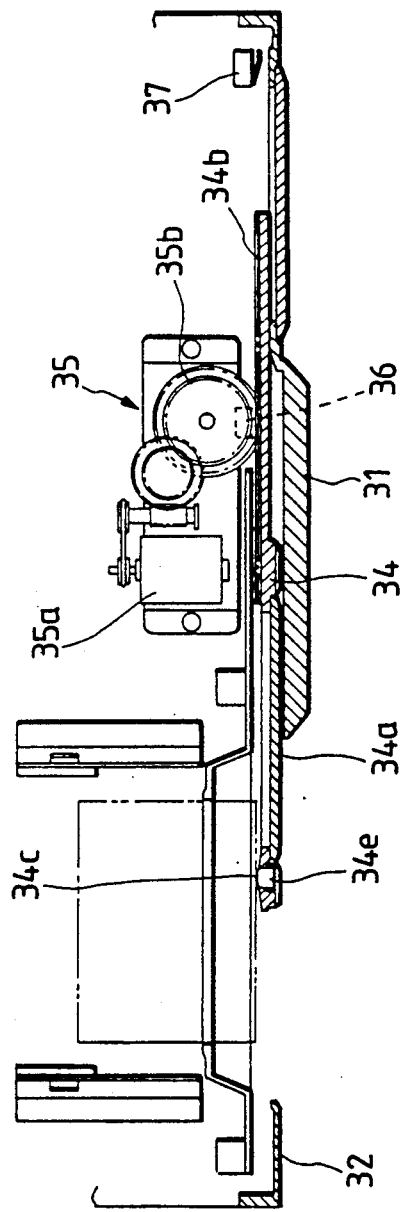
FIG. 13 shows a horizontally sectional view of the door open/close, mechanism on the way of operation thereof.
Figure 16:
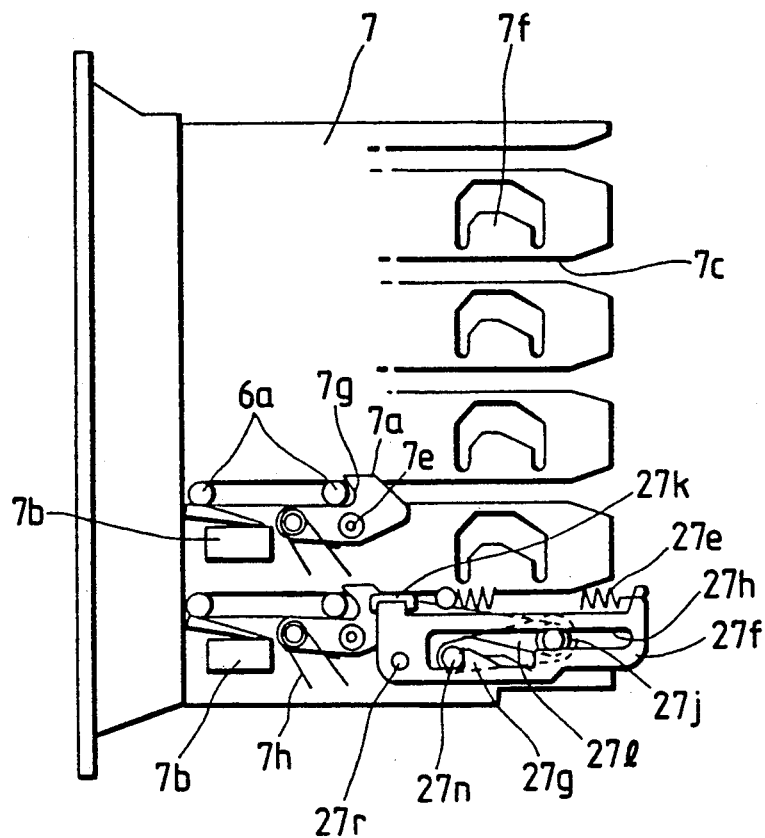
FIG. 16 shows a side view of the auxiliary catcher of the automatic changer in the catcher stand-by state thereof.

Shown at 31 in FIGS. 10, 11 and 12 is a front panel attached to a case 32 so that the insertion opening 31a of the front panel is coincident with those 10a of the panel 10. Buttons 33 for manipulating the tape player are fitted in the central portion of the front panel 31. A transparent panel 31b is attached to the front panel 31 near the end thereof opposite the insertion opening 31a thereof. A display section made of fluorescent display tubes to indicate the state of operation of the tape player is provided behind the transparent panel 31b. The front panel 3a is fitted with a door 34 located behind the manipulation buttons 33 and slidable rightward and leftward. The door 34 is fitted with a transparent plate 34a so that the insertion openings of the panel 10 can be seen through when the door is moved toward the insertion opening 31a of the front panel 31. The door 34 is provided with a rack 34b engaged with the gear 35b of a door driver 35 including a motor 35a whose rotation acts to move the door rightward or leftward to open or close the insertion opening 31a of the front panel 31. The door 34 is also provided with a pusher 34e whose spherical tip 34c projects from the rear of the left end portion of the door and which is urged backward by a spring 34d. When the door 34 is moved rightward or leftward by the door driver 35, the labeled side (opposite the lid of the cassette) may be inserted into the holder 6 through the insertion opening 10a of the panel 10 is likely to by pushed and moved by the spherical tip 34c of the pusher 34e to true up the cassette.

Detection switches 36 and 37 are provided on the rear of the front panel 31 to detect the opening and closure of the door 34.

The operation of the automatic changer is described in detail from now on. One of the manipulation buttons 33 is first pressed to put the door driver 35 into action to move the door 34 rightward to expose the insertion openings 10a of the panel 10. The opening of the door 34 is detected by the detection switch 37 to put the door driver 35 out of action. Since the door 34 is thus moved to the rear of the transparent panel 31b, the display section having been visible through the transparent panel from the front of the tape player so far becomes invisible or the color of the light from the display section is changed, so that the opening of the door can be confirmed by eyesight. At that time, the guide pins 6a of the holder 6 remain inserted in the guide slits 7c of the panel side plates 7 and engaged with the locking levers 7a. The cassette is then put in a horizontal posture and inserted into the holder 6 through the insertion opening 10a of the panel 10 as the cassette slider is located on the underside of the cassette and the cassette lid is located as the upper side thereof. At that time, the lid plate 28 is pushed up and opened backward so that the cassette is completely inserted into the holder 6. The pushed up lid plate 28 pushes the inserted into the holder 6. The pushed up lid plate 28 pushes the inserted cassette downward by the urging action of the spring plate 6e, and the cassette slider is opened by the projections 6f and 6g due to the insertion of the cassette, so that the cassette is retained in the holder 6. When the insertion of all the cassettes is completed, another one of the manipulation buttons 33 is operated to close the door 34. Since the labeled side of each retained cassette, which is located opposite the cassette lid, is visible through the transparent plate 34a of the door 34 while the door is closed, the contents of the retained cassette can be always recognized. At the time of the closure of the door 34, the pusher 34e acts to true up the cassette. When the closure of the door 34 is completed, the detection switch 36 is put into action to find out the closure of the door. If the door 34 is not closed due to the incomplete insertion of the cassette or to the like, the detection switch 36 is not put into action.

Figure 38:
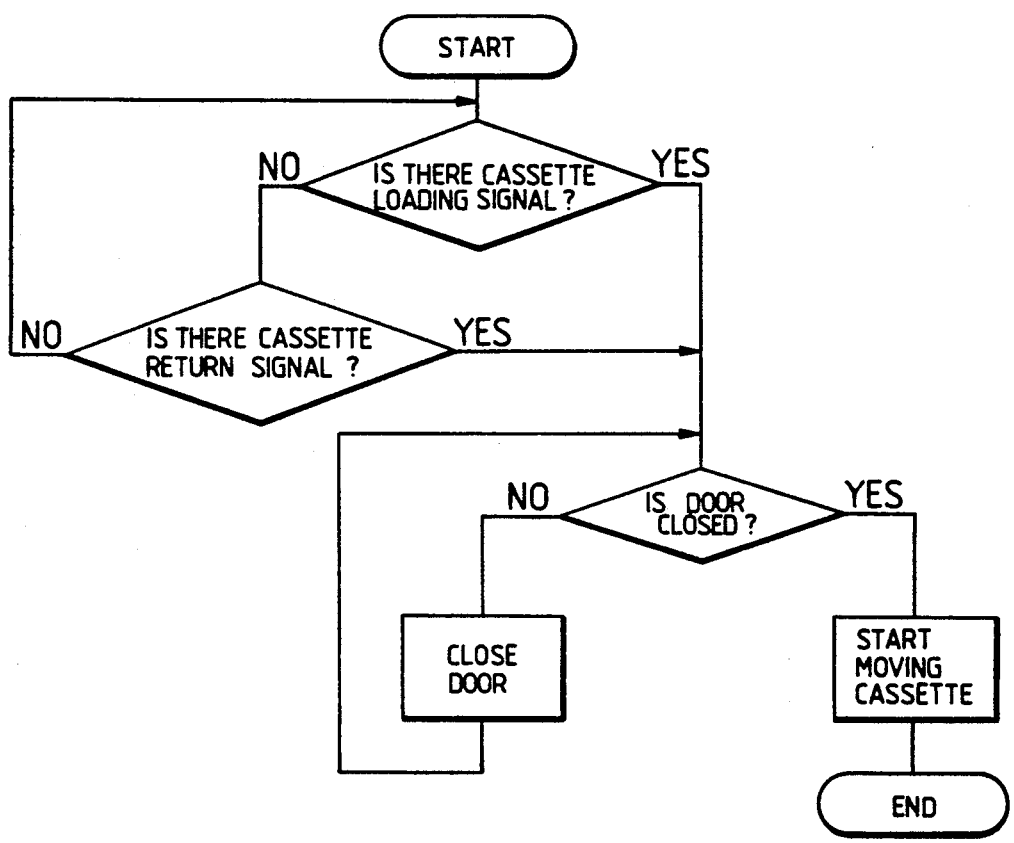
FIG. 38 shows a flow chart of control based on the detection of opening and closure of the door.
Figure 39:
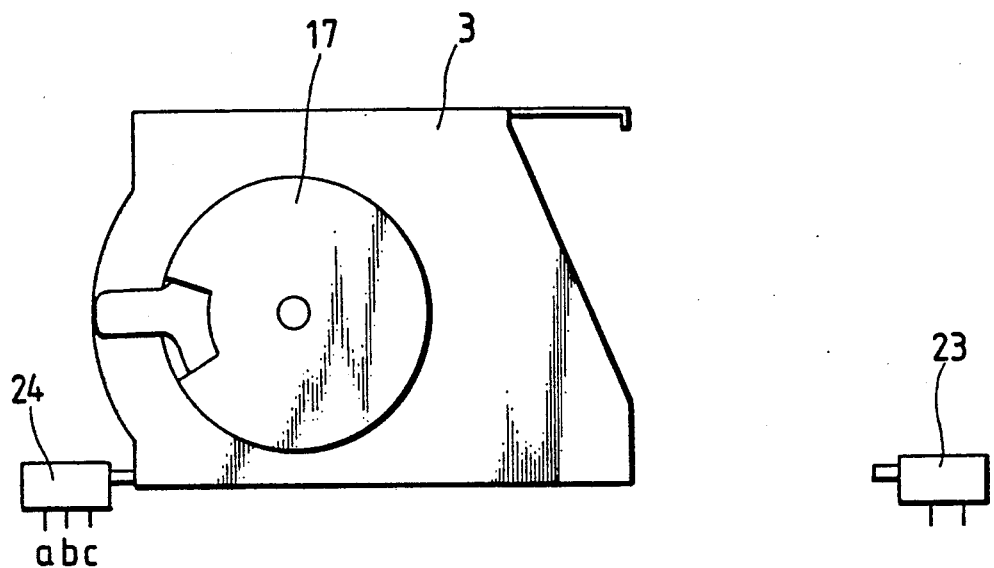
FIGS. 39, 40, 41 and 42 show side views for describing the detection of position of the catcher based on a side plate.
Figure 40:
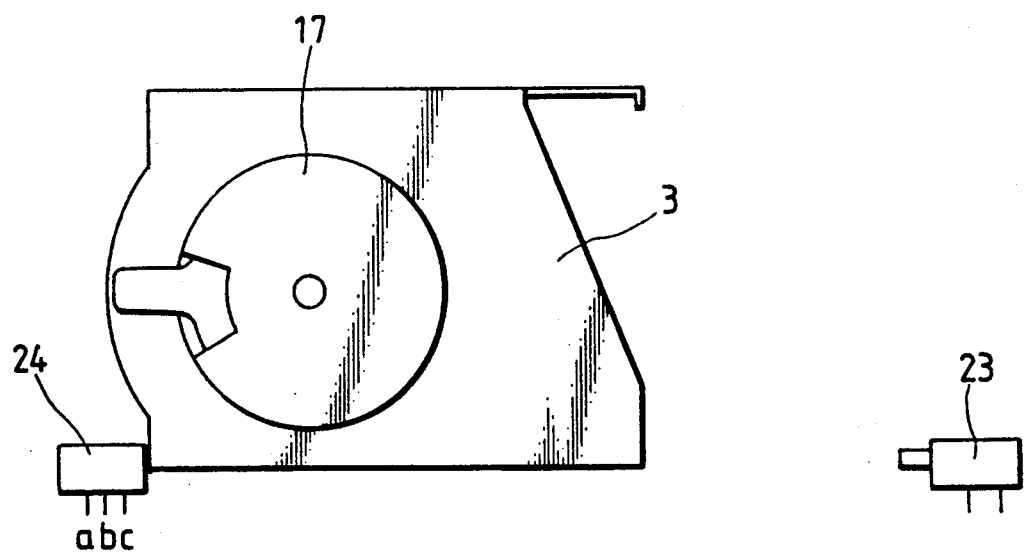
Figure 41:
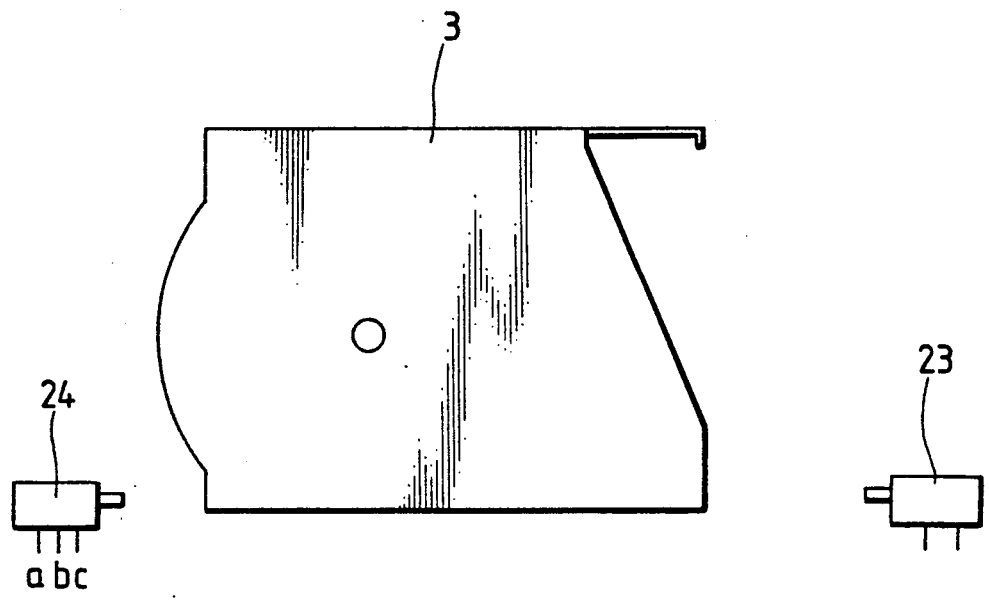

Yet another one of the manipulation buttons 33 is thereafter operated to instruct which of the cassettes loaded in the tape player as described above should be chosen and played. It is then judged as shown in FIG. 38, whether a cassette setting instruction or a cassette return instruction is given or not. When it is judged that the instruction is given, it is then detected by the detection switch 36 whether the door 34 is closed or not. Only when it is detected by the detection switch 36 that the door 34 is closed, the moving unit 29 is put into action.

Figure 17:
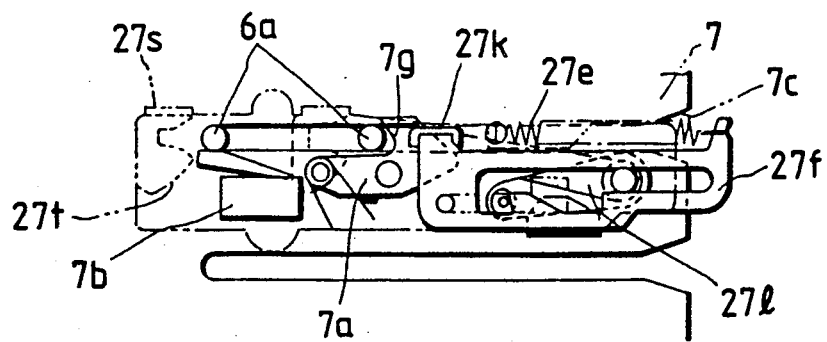
FIG. 17 show a side view of the catcher and auxiliary catcher of the automatic changer in the catcher stand-by state thereof.
Figure 18:
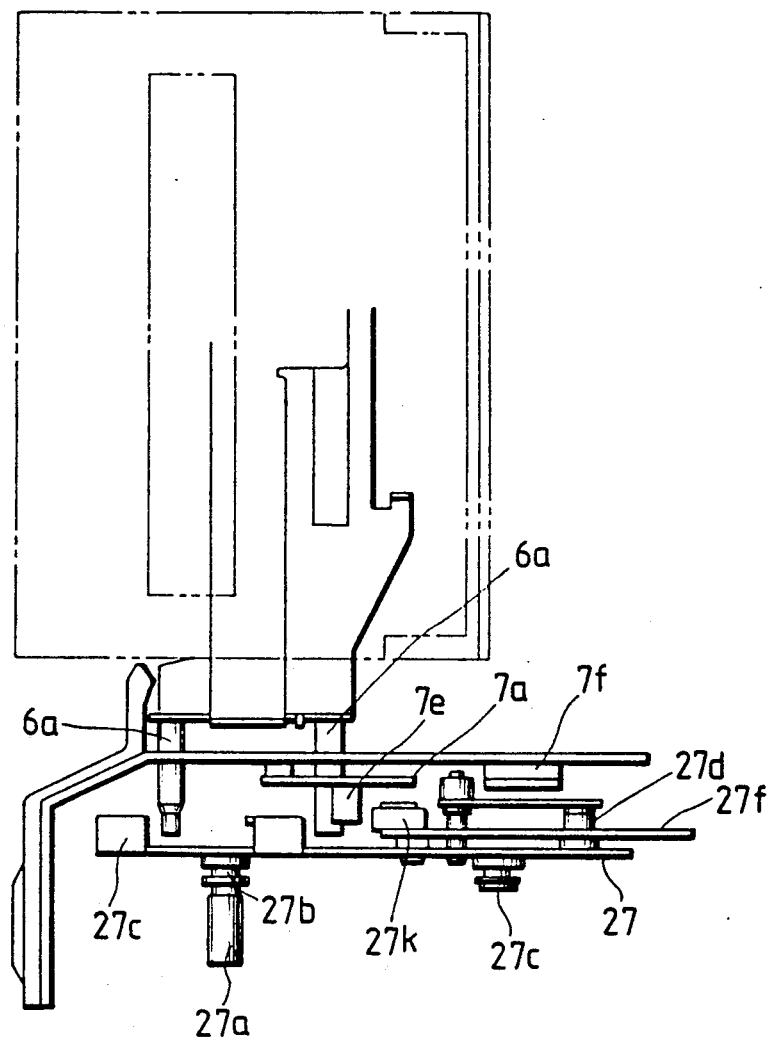
FIG. 18 shows a plan view of the automatic changer in the catcher stand-by state thereof.
Figure 19:
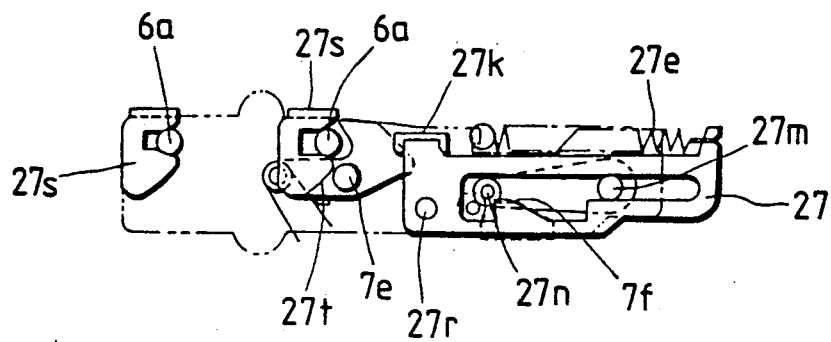
Figure 20:
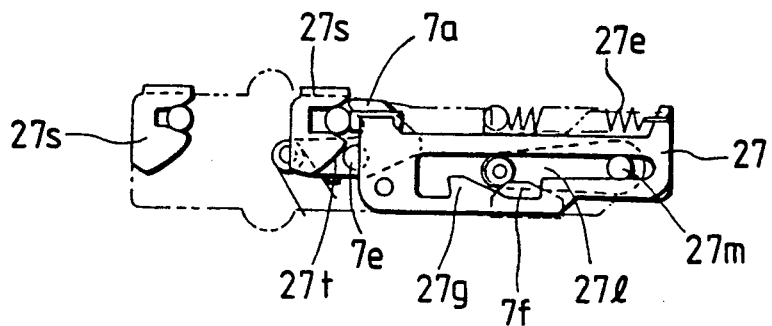

Before the movers 17 are operated and the moving unit 19 put into action, the engaging portions 27s and rubber stoppers 27k of the catchers 27 are located differently from the pins 7e of the locking levers 7a and the guide pins 6a of the holder 6 as to the front-to-rear direction of the tape player, as shown in FIGS. 17 and 18. When the moving unit 19 is rotated in that state, the gear 19h drives the moving gears 17a to rotate the moving plates 17b as the projections 17d remain engaged with the moving gears at the notches 17c by the urging actions of the springs 17f. The catchers 27 having their shafts 27a inserted into the guide holes 17e of the moving plates 17b are lifted to a height corresponding to the rotative angle of the moving plates, because of the rotation of the moving plates. The rotative angle of the movers 17 is detected by the rotary encoder 2 to stop the rotation of the moving unit 19 when the catchers 27 have reached the height of the holder 6 retaining the cassette to be played. When the catchers 27 are thus stopped, the drive unit 11 begins to rotate so that the base plate 5 fitted with the drive unit is moved backward through the engagement of the drive gear 11 and the rack 22. Since the shafts 27a of the catchers 27 are inserted in the guide holes 4a of the slide plate 4 and the guide holes 2a and 3a of the side plates 2 and 3, which are secured to the base plate 5, the catchers are moved backward together with the base plate so that the rollers on the locking levers 27 of the catchers 27 come into contact with the cam surfaces 7f of the side plates 7 to push up the locking levers to disengage the auxiliary catchers 27f from the shafts 27n on the locking levers. When the disengagement is performed, the engaging portions 27s are already fitted on the guide pins 6a by the movement of the catchers 27. Because of the disengagement, the auxiliary catchers 27f are moved by the pulling actions of the springs 27e, as shown in FIG. 20, so that the rubber stoppers 27k come into contact with the guide pins 6a to surely maintain the fitting of the engaging portions 27s and the guide pins 6a.

Figure 21:
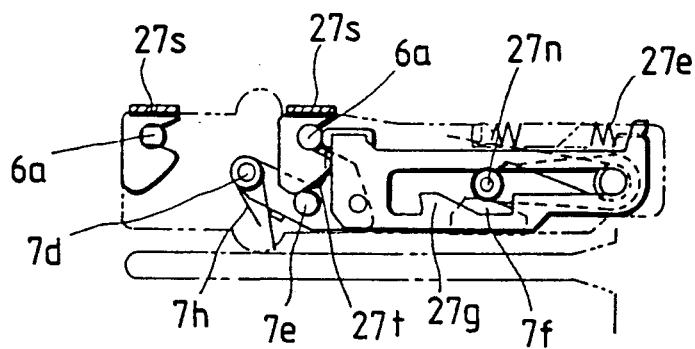
Figure 22:
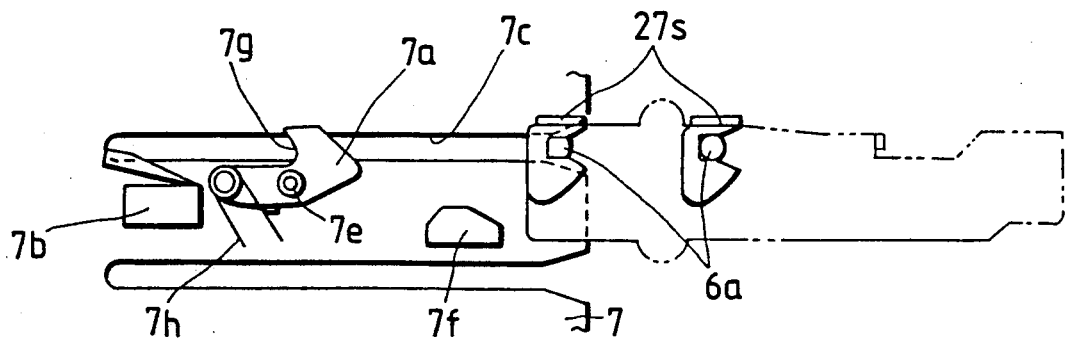
Figure 25:
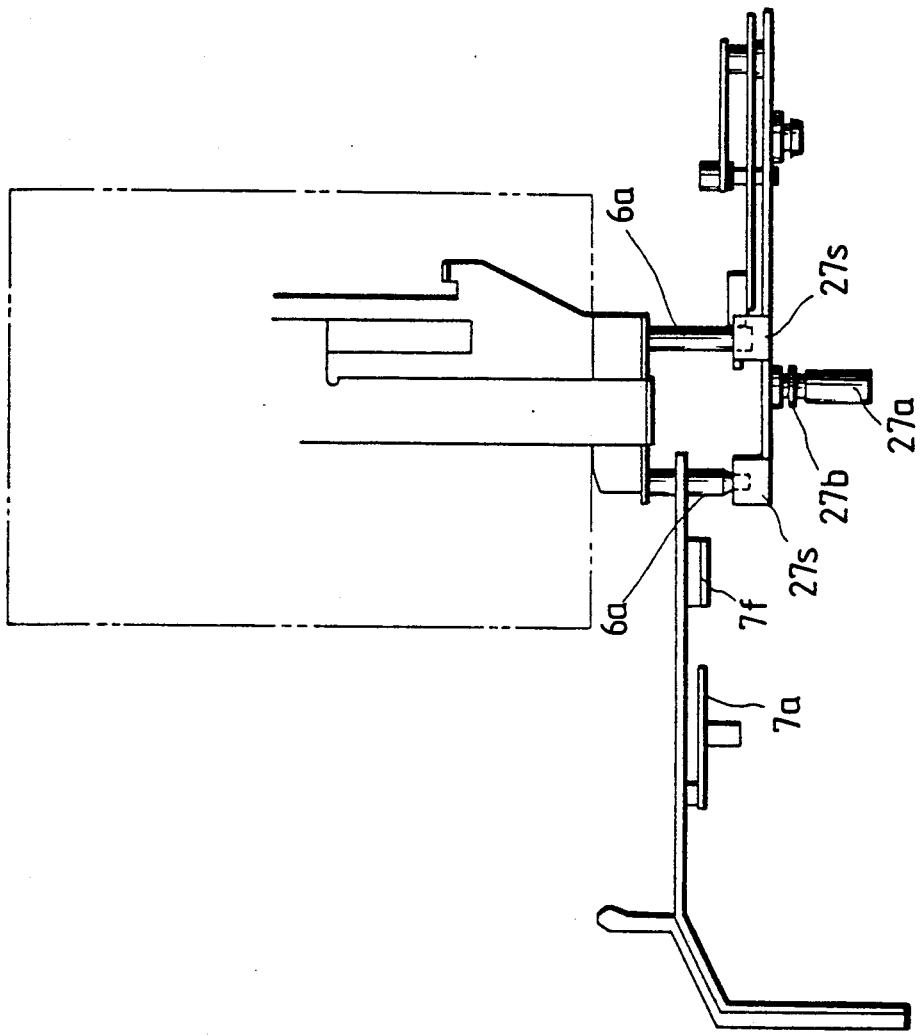
FIG. 24 and 25 show plan views of the catcher in cassette backward conveyance steps shown in FIGS. 21 and 22.

As soon as the holding of the guide pins 6a by the engaging portions 27s and the rubber stoppers 27k is completed, the cams 27t come into contact with the pins 7e on the locking levers 7a as shown in FIG. 21 and push the pins down to disengage the guide pins 6a from the stoppers 7g to make it possible to move the holder 6 backward.

When the guide pins 6a are completely pulled out of the guide slits 7c as the holder 6 is moved backward together with the catchers 27 as mentioned above, the base plate 5 puts the detection switch 23 into action to put the drive unit 11 out of action to stop the movement of the base plate. At the same time as the stoppage of the movement of the base plate 5, the moving unit 19 starts revolving to rotate the movers 17 in the same direction again. As a result, the guide pins 6a are inserted in the guide holes 17e of the movers 17 are lifted along the long vertical portions of the guide holes 2a and 3a of the side plates 2 and 3 and the guide holes 4a of the slide plate 4 so that the holder 6 is lifted together with the catchers 27. After the tops of the long vertical portions of the guide holes 2a and 3a are reached, the catchers 27 and the holder 6 are moved backward while the slide plate 4 is moved backward along the horizontal portions of the guide holes 2a and 3a, so that the cassette retained in the holder 6 is moved to a place over the mechanical unit 29. After the short vertical portions of the guide holes 2a and 3a are reached, the guide pins 6a are moved down in the guide holes 4a to move the catchers 27 and the holder 6 down, open the cassette lid and set the cassette on a tape running mechanism. Besides, the moving gears 17a continue to rotate, the relative positions of the moving plates 17b to the moving gears are changed against the urging actions of the springs 17f, and the cassette is pushed down by the forces of the springs so that the cassette is surely set on the tape running mechanism. After that, the moving unit 19 is put out of action so that the tape in the cassette can be played.

During the playing of the tape, the manipulation button 33 can be operated to open the door 34 to replace the other cassette with another one. However, since the holder 6, which keeps a clocking plate 8 in a lifted position when the holder is in the forwardly moved position thereof, is moved out of the forwardly moved position so as to convey the cassette to set it on the tape running mechanism, the blocking plate goes down out of the lifted position and extends downward, as shown for the second lowermost cassette loading space in FIG. 30, to make it impossible to insert another cassette along the blocking plate.

After the completion of the playing of the tape or at an optional point in time, the tape can be wound back in the cassette by pressing a manipulation button 33. After the completion of the winding-back of the tape, the moving unit 19 is rotated in reverse to drive the movers 17 in reverse to move the catchers 27 upward, forward and downward along the guide holes 2a and 3a of the side plates 2 and 3 and move the slide plate 4 forward. Since the detection switch 7b corresponding to the holder 6 moved out of the cassette loading space is off and the other detection switches 7b are on, it can be detected which guide slit 7c corresponds to the moved-out holder.

Figure 31:
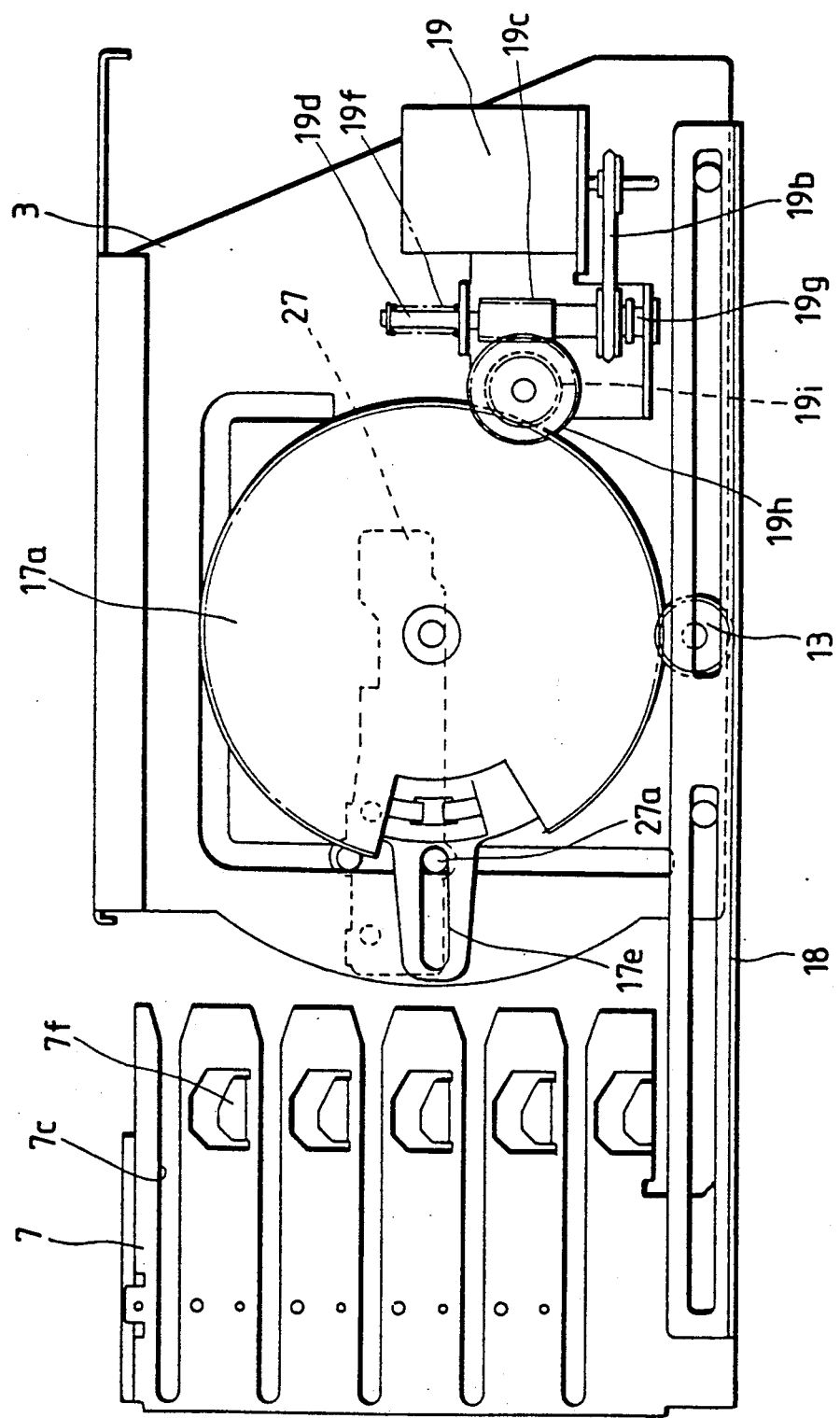
FIG. 31, 32 and 33 show side views of them over and moving unit of the automatic changer.
Figure 32:
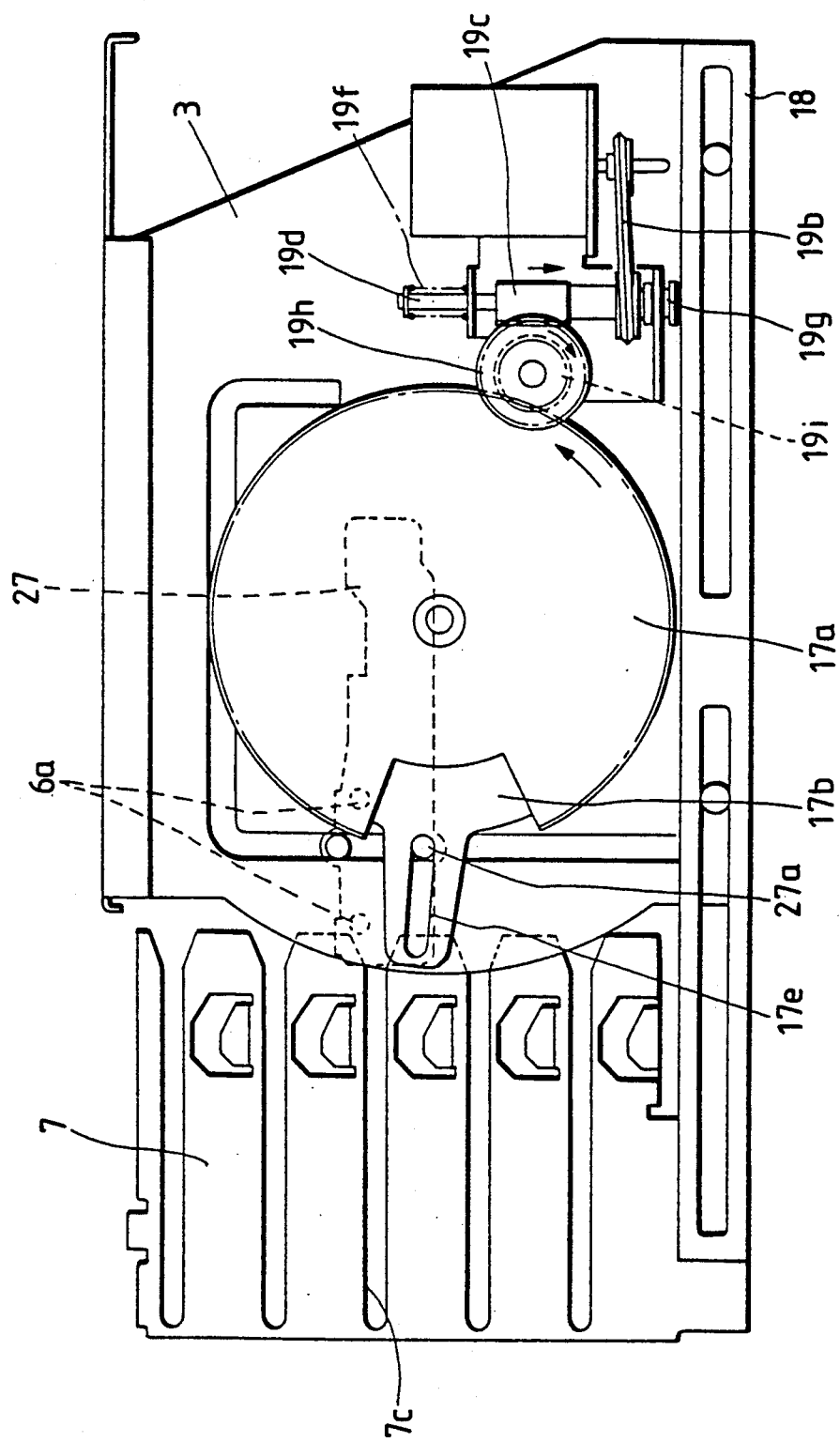
Figure 33:
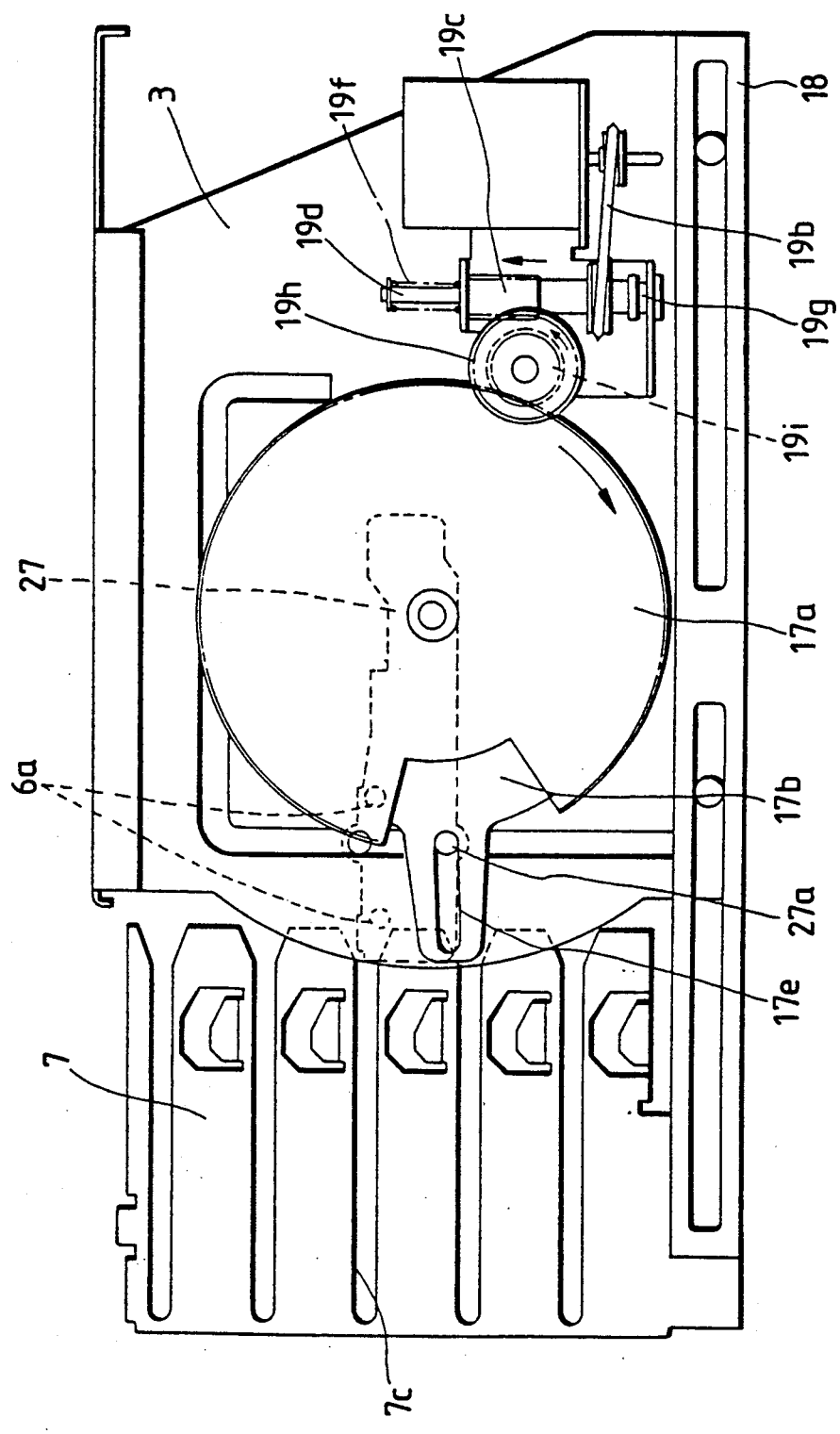
Figure 34:
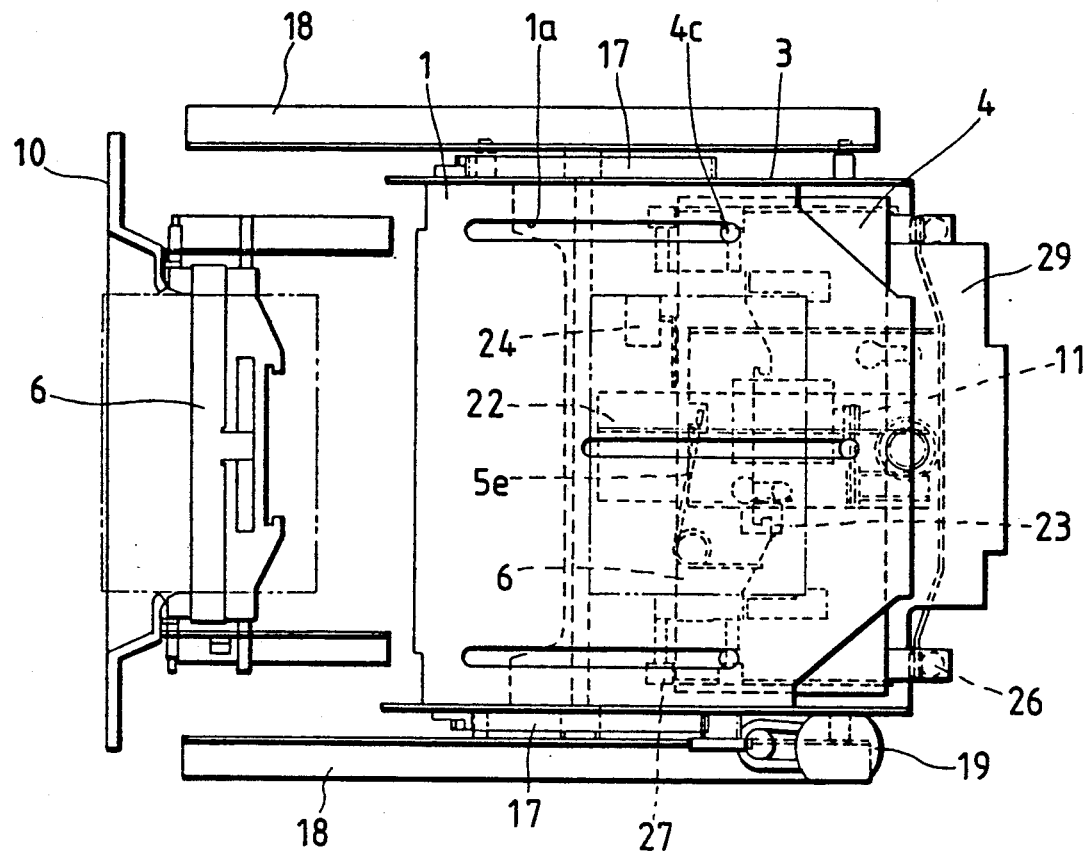
FIG. 34 shows a plan view of the automatic changer in cassette backward conveyance.
Figure 35:
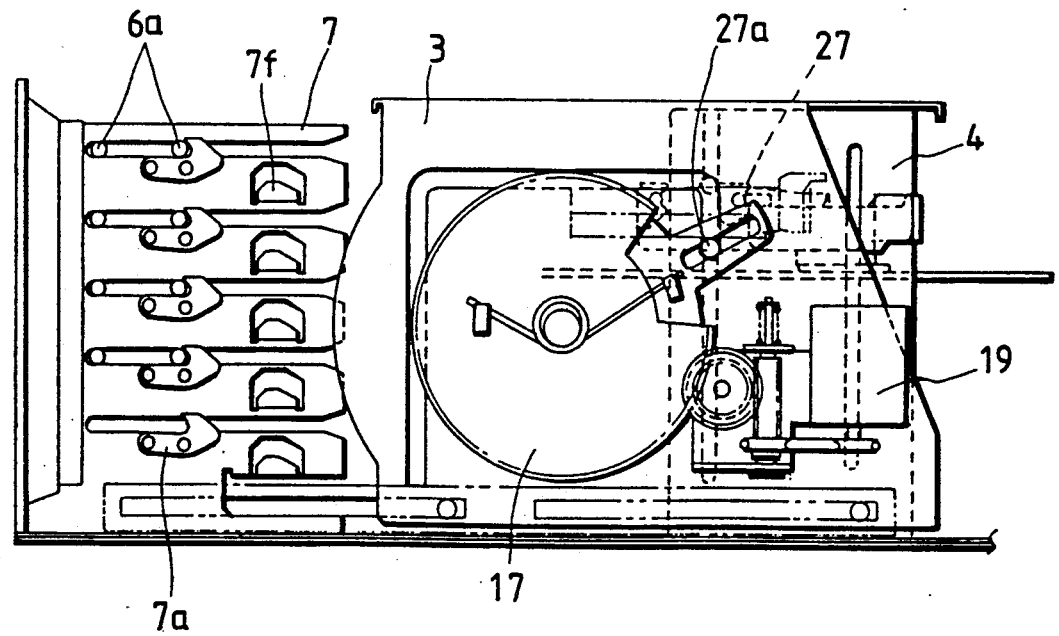
FIG. 35 shows a side view of the automatic changer in cassette forward conveyance.
Figure 36:
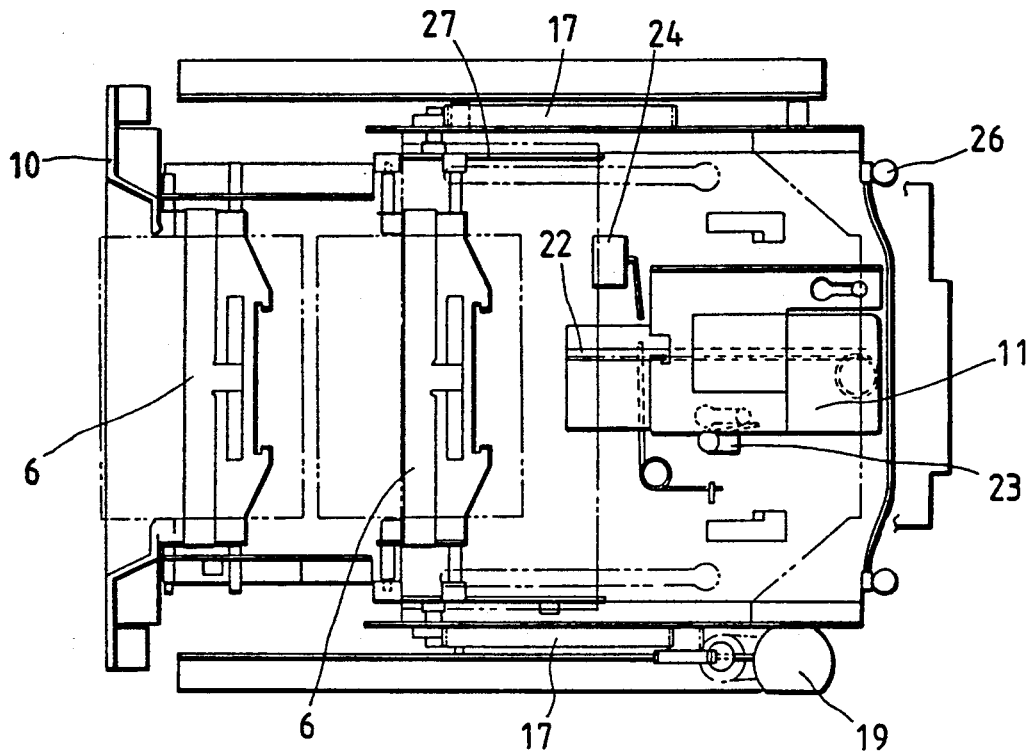
FIG. 36 shows a plan view of the automatic changer in cassette forward conveyance.
Figure 37:
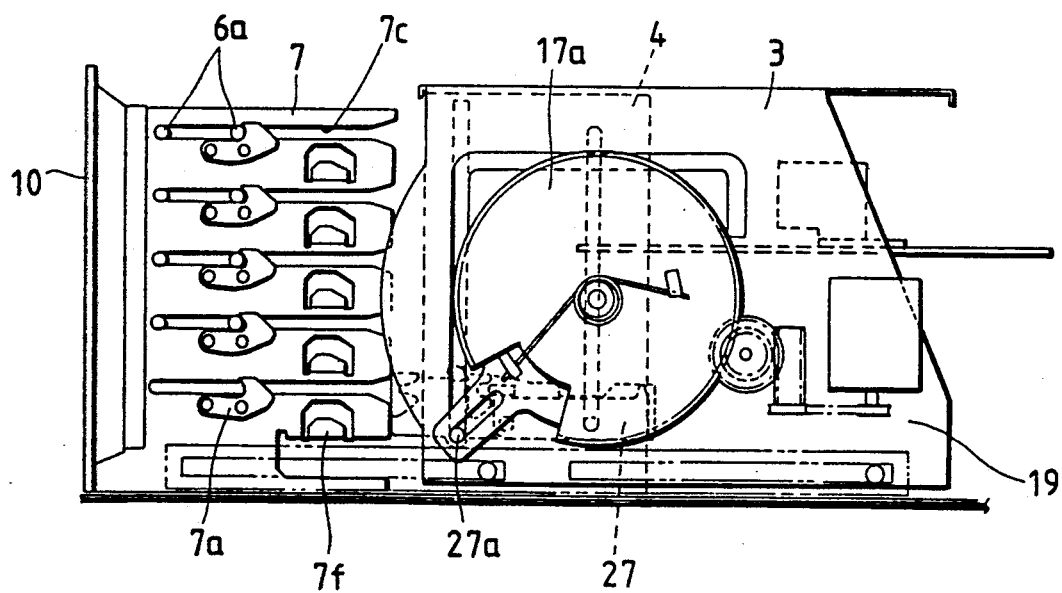
FIG. 37 shows a plan view of the automatic changer in cassette forward conveyance.

When the catchers 27 are moved down to the height of the detected guide slit 7c, the moving unit 19 is put out of action. The open end of each guide slit 7c is divergently enlarged to cope with the case that the positions of the movers 17 stopped by putting the moving unit 19 out of action as mentioned above deviate up or down (as shown in FIG. 32 or 33) from such positions as to straightly oppose the guide pins 6a to the guide slits as shown in FIG. 31. As for the positions of the movers 17 shown in FIG. 32, the guide pins 6a come into contact with the edges of the panel side plates 7 over the guide slits 7c at the open ends thereof so that the edges push the guide pins downward to turn the movers 17 to push down the worm 19c against the force of the spring 19f within the limit set by the limit ring 19g. As for the positions of movers 17 shown in FIG. 33, the guide pins 6a come into contact with the edges of the panel side plates 7 under the guide slits 7c at the open ends thereof so that the edges push the guide pins 6a upward to turn the movers 17 to push up the worm 19c.

Figure 24:
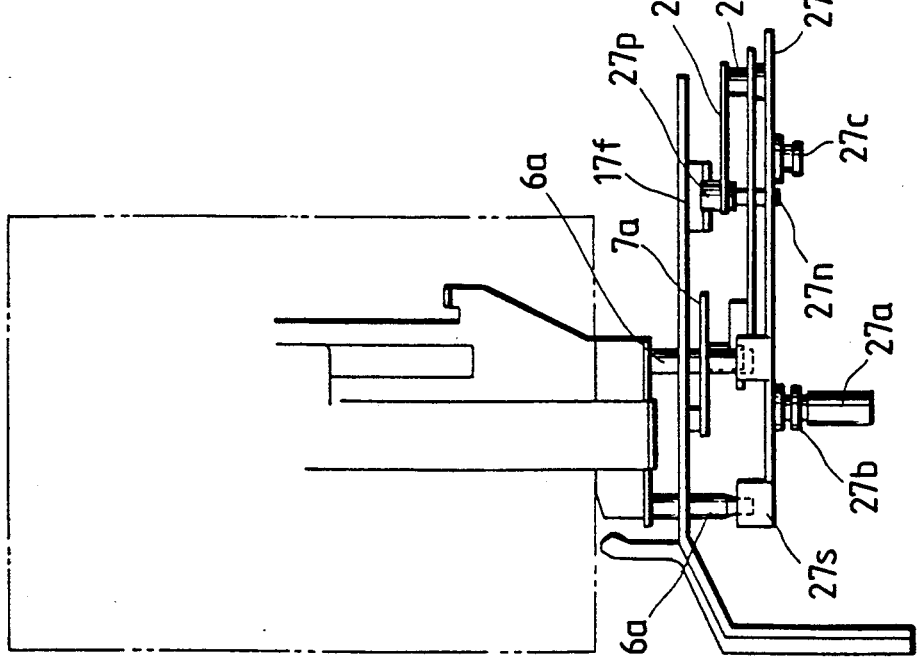
Figure 26:
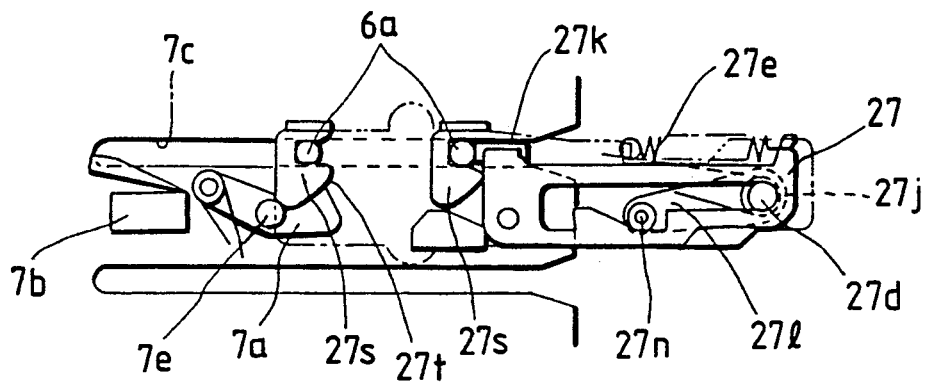
FIGS. 26, 27 and 28 show side views of the catcher in the process of cassette forward conveyance.
Figure 27:
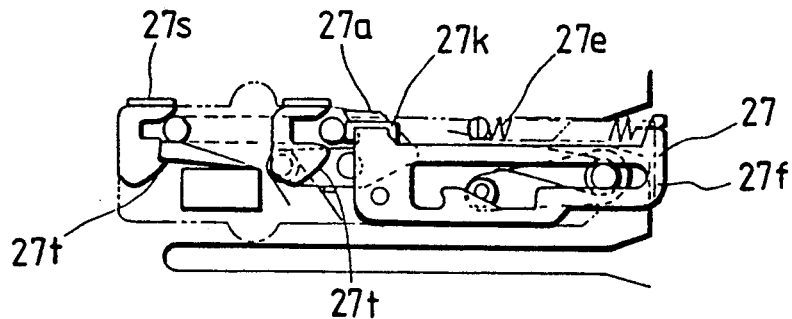
Figure 28:
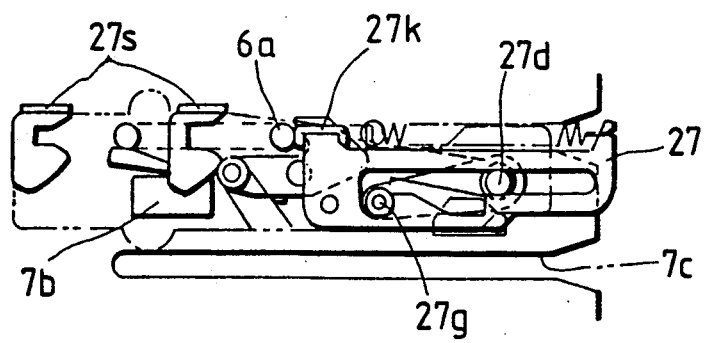
Figure 42:
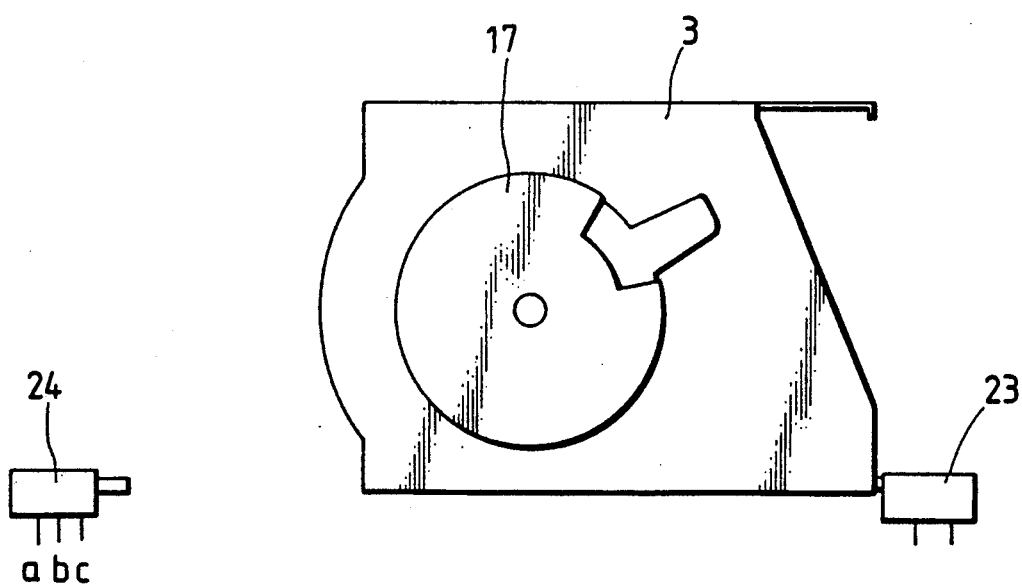
Figure 43:
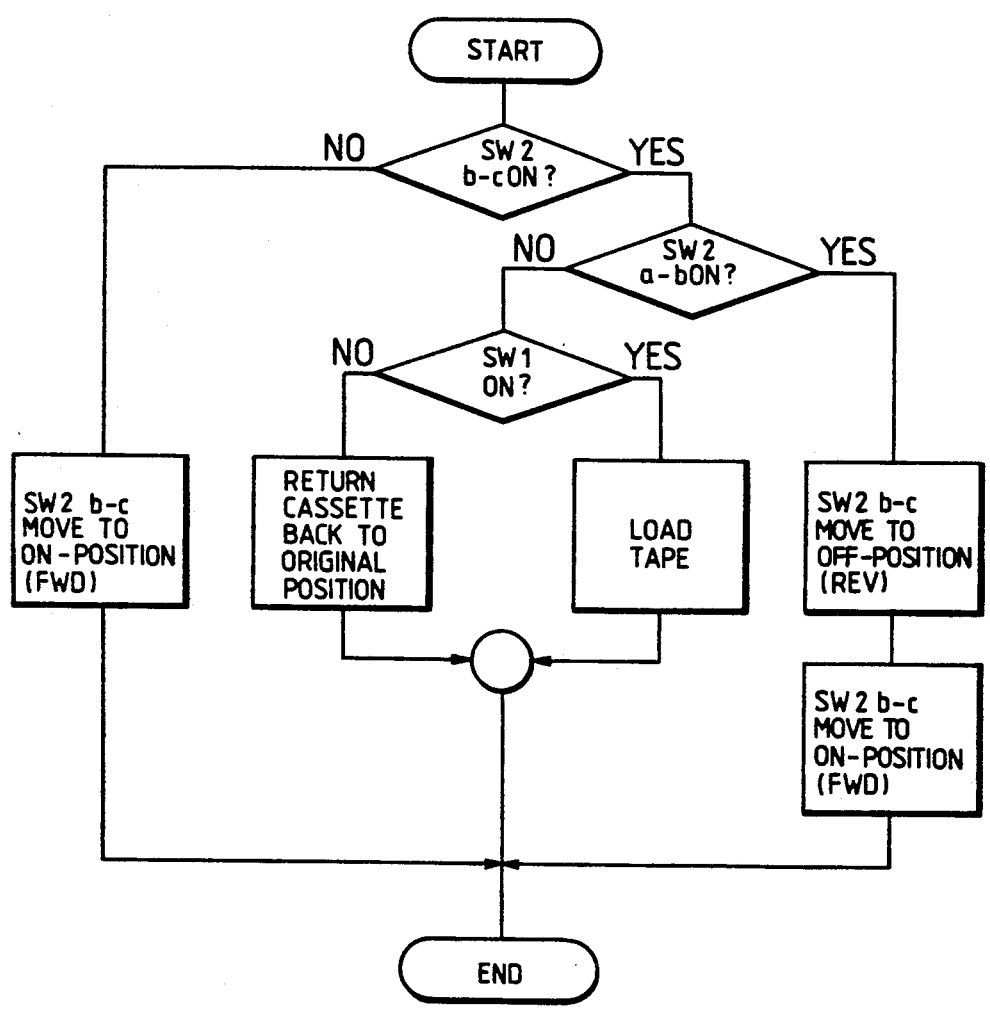
FIG. 43 shows a flow chart of control based on the detection of position of the catcher.
Figure 44:
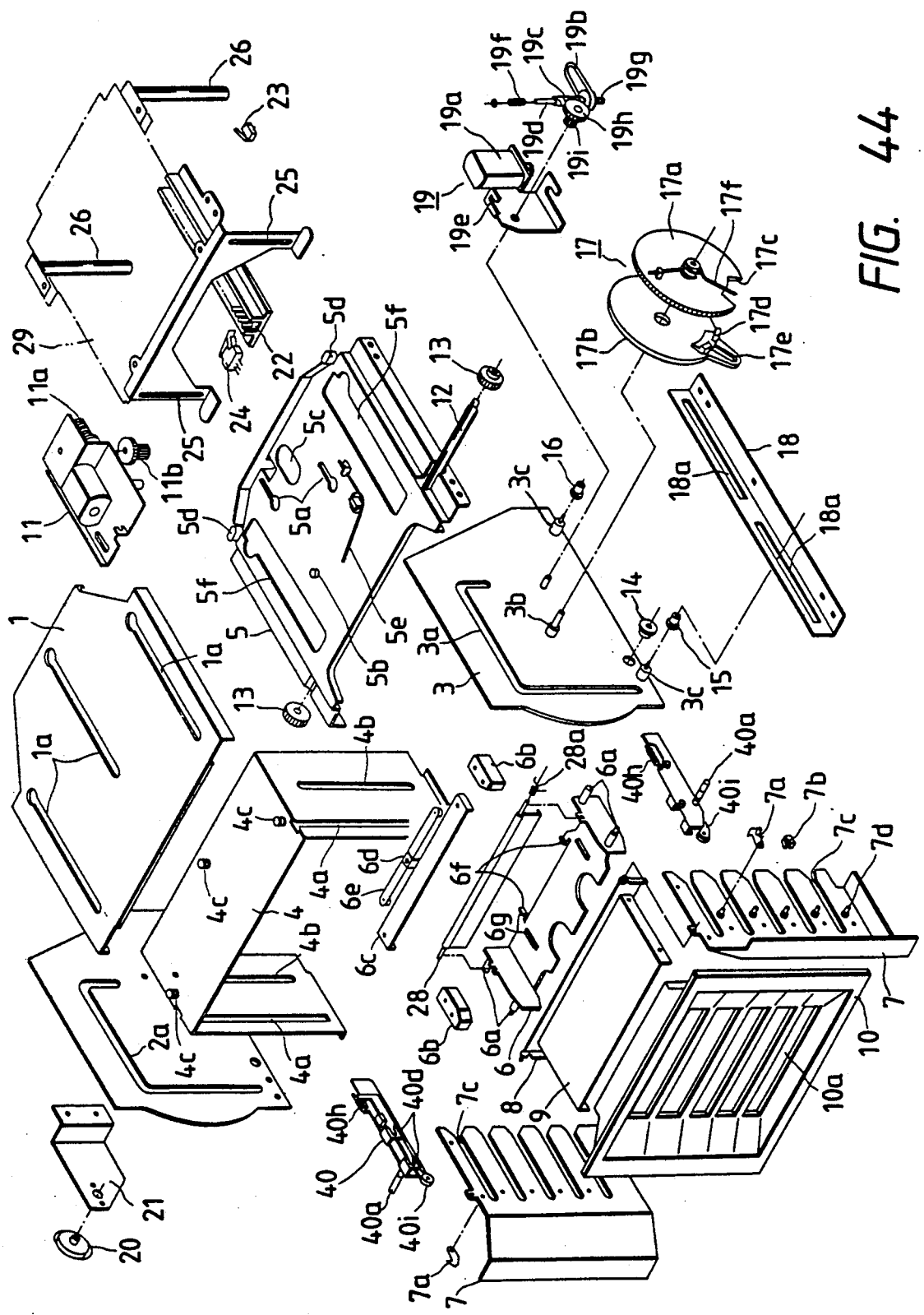
FIG. 44 shows an exploded perspective view of an automatic changer which is another embodiment of the present invention.

The guide pins 6a are thus inserted into the guide slits 7c again as the baseplate 5 is pushed forward by the rotation of the drive unit 1 to return the catchers 27 and the holder 6 forward together with the slide plate 4 and the side plates 2 and 3. When the catchers 27 are to be returned forward, the guide pins 6a first push down the locking levers 7a, as shown in FIG. 26, so that the guide pins are moved to the stoppers 7g of the locking levers. The guide pins 6a are then moved to the closed ends of the guide slits 7c as shown in FIG. 27, so that the guide pins cannot be moved forward any more. However, the catchers 27 still continue to move forward so that the engaging portions 27s are disengaged from the guide pins 6a. At that time, the guide pins 6a are already engaged with the stoppers 7g of the locking levers 7a. The catchers 27 thereafter still continue to move forward, but the guide pins 6a hinder the rubber stoppers 27k of the auxiliary catchers 27f from moving forward. Since the pins 27n have passed on the cam surfaces 7f at that time, the pins fall on the stoppers 27g at the end of passing of the stoppers so that the auxiliary catchers 27f are stopped by the pins engaged therewith. At the same time, the detection switch 24 is put into action to rotate the drive unit 11 in reverse again to return the catchers 27 to positions shown in FIG. 17. After that, the drive unit 11 is put out of action. It is preferable that a shorting switch is used as the detection switch 24 for such operation. The terminals a, b and c of the detection switch 24 are connected to each other in a state shown in FIGS. 17 and 39. The terminals a and b of the detection switch 24 are connected to each other in another state shown in FIGS. 28 and 40. The terminals b and c of the detection switch 24 are connected to each other in yet another state which is shown in FIG. 24 are connected to each other in another state shown in FIGS. 28 and 40. The terminals b and c of the detection switch 24 are connected to each other in yet another state which is shown in FIG. 42 and in which the cassette is set on the tape running mechanism. In the state shown in FIGS. 17 and 39, the catchers 27 are moved up or down. At that time, the auxiliary catches 27f need to be locked. However, the auxiliary catchers 27f remain unlocked when the automatic changer is stopped in a position shown in FIG. 39, for example, due to power outage during the forward movement of the automatic changer. Nevertheless, a control program shown in FIG. 43 can be executed because the auxiliary catchers 27f are locked when power is restored. The control program is to give the drive unit 11 an operating instruction corresponding to the state of the automatic changer, in terms of the turning-on of the detection switch 24 and the turning-on and turning-off the other detection switch 23.

After the holder 6 is separated from the catchers 27 through the above-described operation, the moving unit 19 is rotated again to move the catchers 27 to the lowermost positions thereof to complete the forward conveyance of the cassette from the tape running mechanism.

When the cassette is replaced with another one and the later is to be conveyed backward and played, the above-described operation is repeated.

Figure 45:
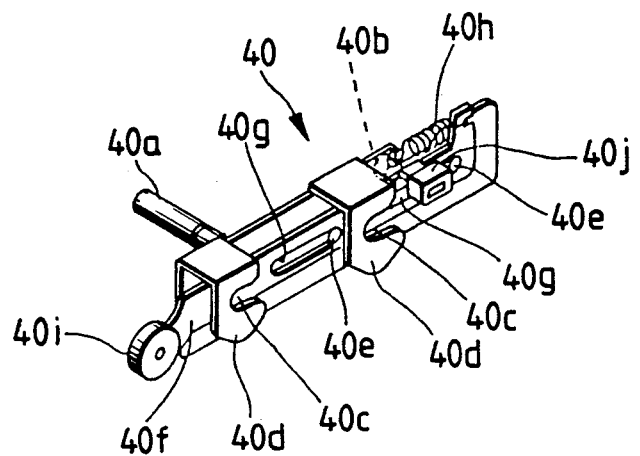
FIG. 45 shows a perspective view of the catcher of the automatic changer shown in FIG. 44.
Figure 50:
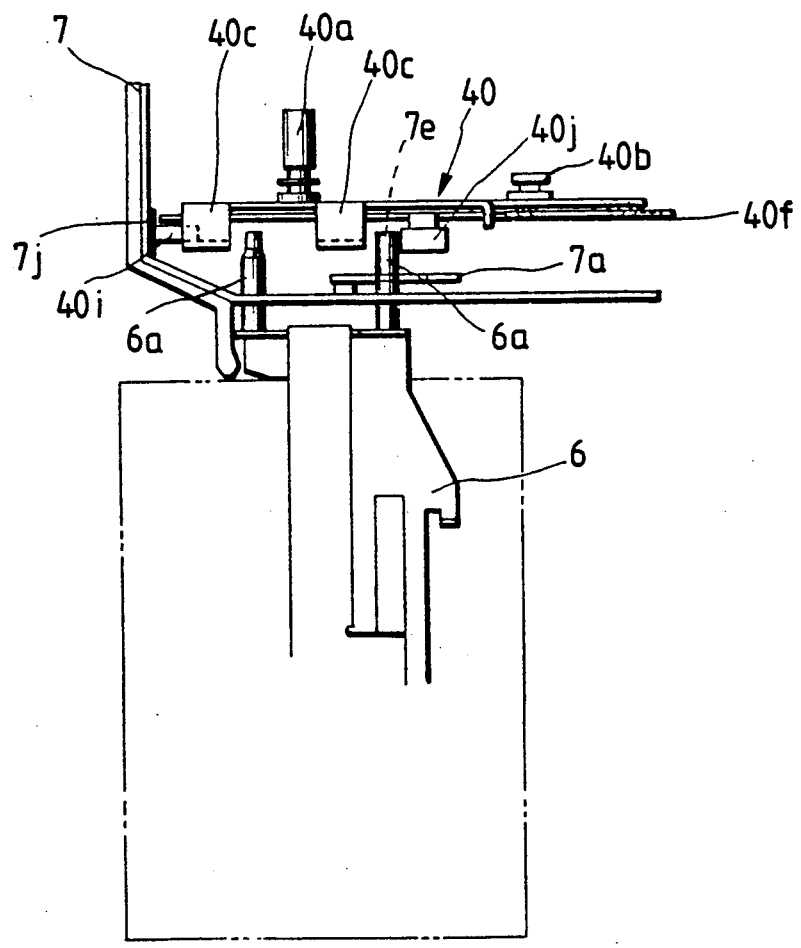
FIG. 50, 51 and 52 show pan views for describing the process of grasping of the holder by the catchers of the automatic changer shown in FIG. 44.
Figure 46:
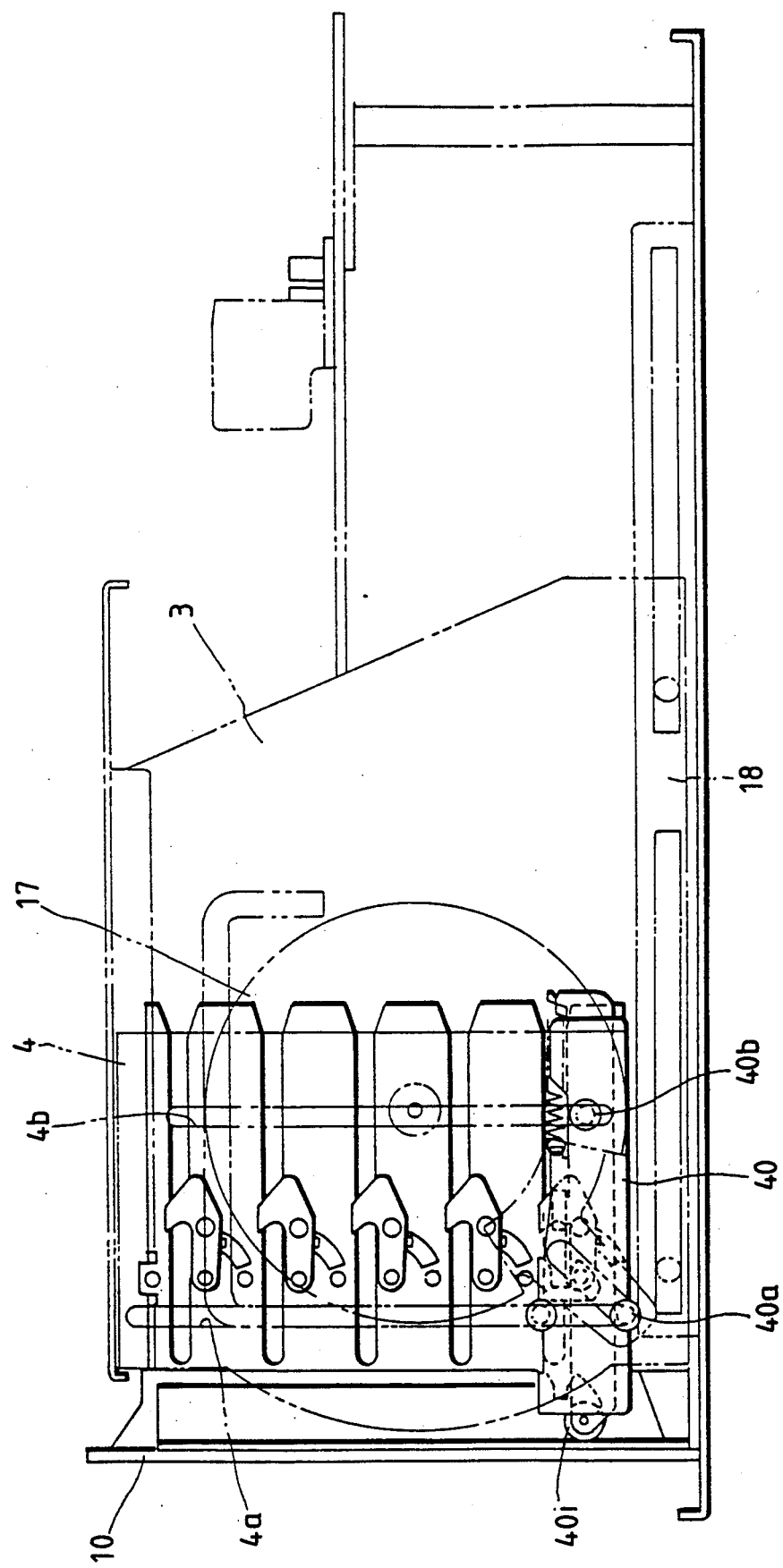
FIG. 46 shows a side view of the automatic changer shown in FIG. 44, before cassette backward conveyance.
Figure 47:
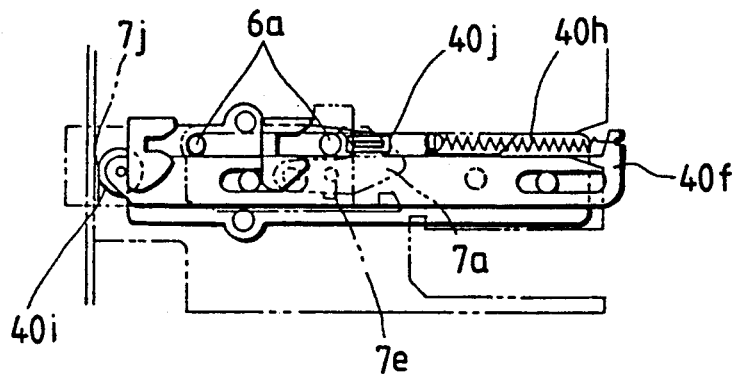
FIG. 47, 48 and 49 show side view for describing the process of grasping of a holder by the catchers of the automatic changer shown in FIG. 44.
Figure 48:
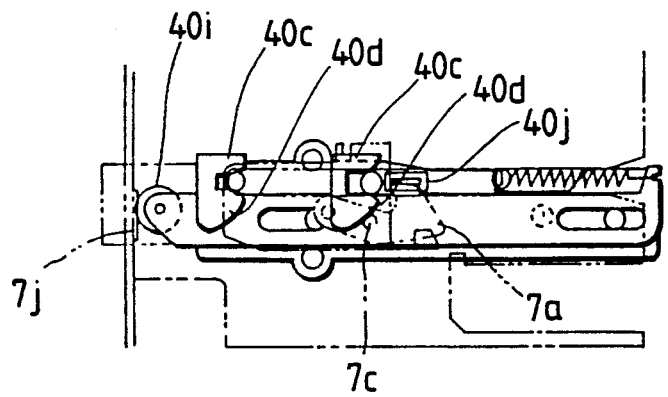

Another embodiment of the present invention, which is an automatic changer for a digital audio cassette tape player, is hereafter described with reference to FIGS. 44 through 52. The embodiment is all the same as the preceding embodiment except for catchers and panel side plates, only about which the present embodiment is therefore described. FIG. 45 shows the left catcher 40 of the automatic changer whose right catcher 40 is constituted symmetrically to the left one. Support shafts 40a, which are inserted into the guide holes 4a of a slide plate 4, and other support shafts 40b, which are inserted into the other guide holes 4b of the slide plate, are provided on the catchers 40. Engaging portions 40c corresponding to those 27s of the preceding embodiment and cams 40d corresponding to those 27t of the preceding embodiment are provided in the catchers 40 on the sides thereof opposite the support shafts 40a and 40b. pins 40e are slidably fitted in the slender holes 40g of auxiliary catchers 40f. A spring 40h is provided between the catcher 40 and the auxiliary catcher 40f and urges the auxiliary catcher forward. The auxiliary catchers 40f are provided with rollers 40i at the front ends of the auxiliary catchers and rubber stoppers 40j corresponding to those 27k of the preceding embodiment. The rollers 40i can roll on the inside surfaces 7i of the front portions of panel side plates 7 which do not have cam surfaces corresponding to those 7f of the preceding embodiment. When the automatic changer is in a standby state before movers 17 begin to rotate, the catchers 40 are in the lowermost positions shown in FIG. 46 and the rollers 40i are in contact with the inside surfaces 7i of the front portions of the panel side plates 7 as shown in FIGS. 47 and 48.

Figure 49:
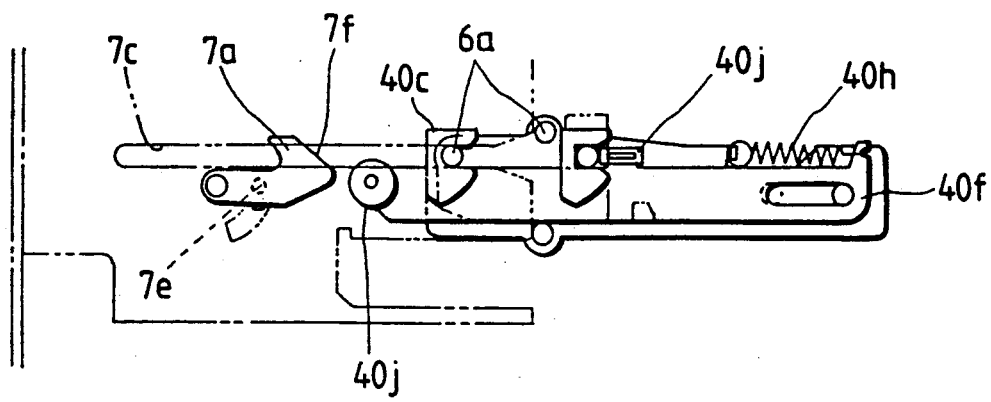
Figure 52:
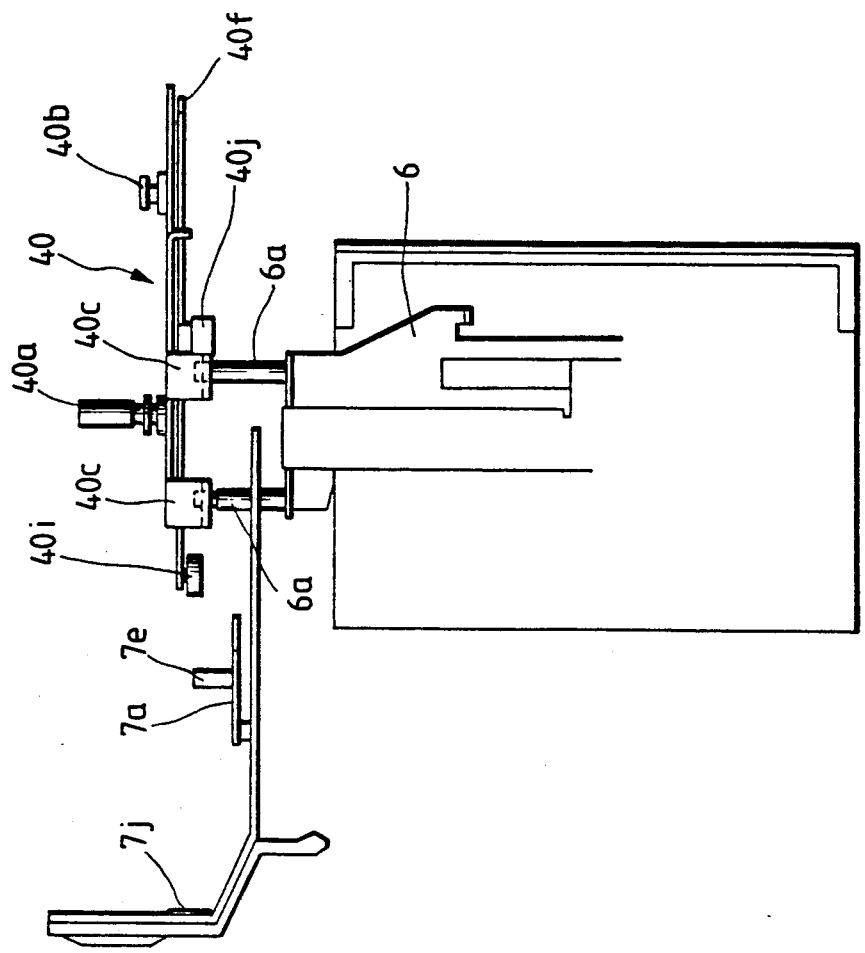
Figure 51:
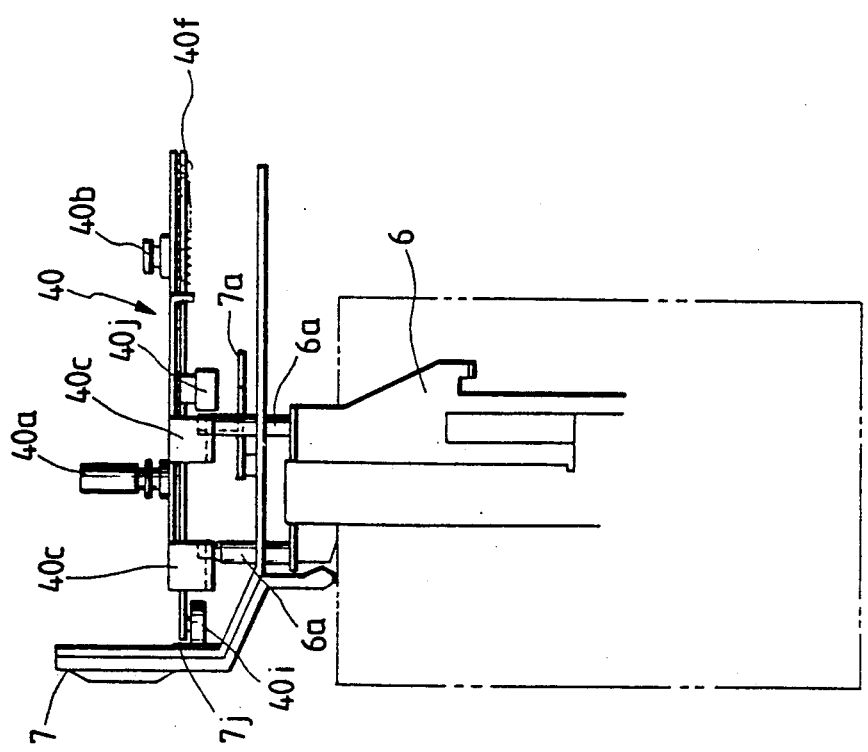

When the movers 17 are rotated in accordance with an instruction on which loaded cassette should be set on the tape running mechanism of the tape player, the catchers 40 are lifted through the fitting of the support shafts 40a and the guide holes 17e of the movers. When it is found out through a rotary encoder 20 that the catchers 40 are lifted to the position of the cassette which is to be set on the tape running mechanism, the rotation of the movers 17 is stopped so that the catcher 40 are halted where they are. After that, a base plate 5 is moved backward by the rotation of a drive unit 11 so that the catchers 40 are also moved backward. As a result, the engaging portions 40c are fitted with guide pins 6a, and the auxiliary catchers 40f are left with the rollers 40i remaining in contact with the inside surfaces of the front portions of the panel side plates 7 due to the urging actions of the springs 41h, as shown in FIGS. 48 and 51, so that the rubber stoppers 40j are put in contact with the guide pins 6a to prevent the guide pins from going out of the engaging portions 40c. At the same time, pins 7e on locking levers 7a are pushed by the cams 40d to push down the locking levers to disengage the guide pins 6a from the stoppers 7g of the levers. Since the backward movement of the base plate 5 is continued, the guide pins 6a are pulled out of guide slits 7c as the guide pins remain held by the engaging portions 40c and the rubber stoppers 40j, as shown in FIGS. 49 and 52, so that a holder 6 is pulled out of the panel side plates 7 backward as the cassette remains retained by the holder. After that, the cassette is set on the tape running mechanism in the same manner as the preceding embodiment.

The operation of the catchers 60 by the guide pins 6a in the guide slits 7c during the return of the cassette from the tape running mechanism to the panel side plates 7 is performed in reverse to the above-described operation. In this embodiment, however, the guide pins 6a push the cam surfaces 7f of the locking levers 7a so that the guide pins are stopped by stoppers 7g engaged therewith.

Figure 53:
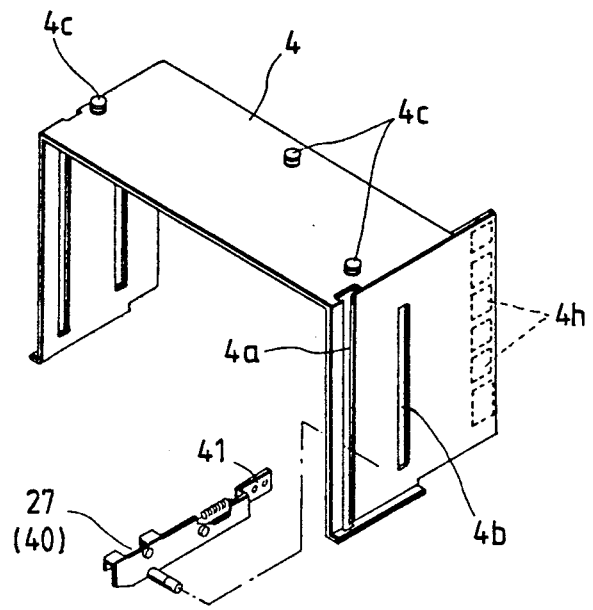
FIG. 53 shows a perspective view of the slide plate and catcher of an automatic changer which is yet another embodiment of the present invention.
Figure 54:
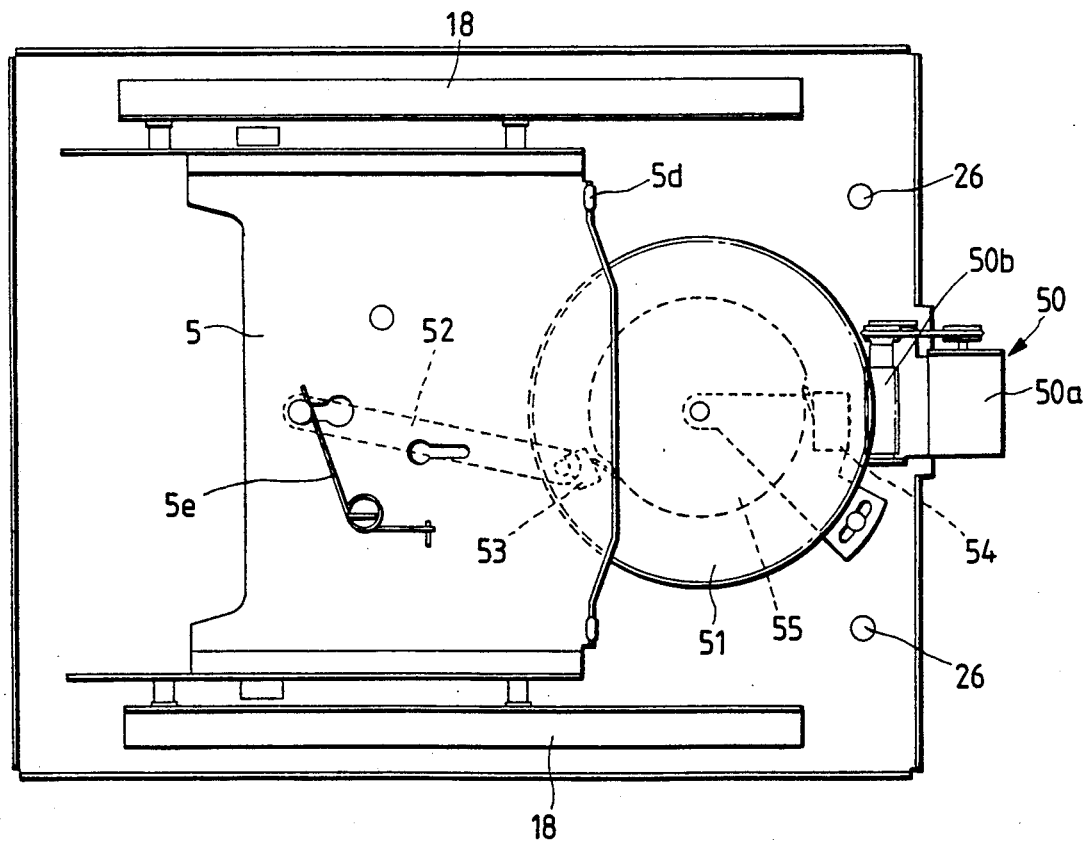
FIG. 54 shows a plan view of an automatic changer, which is yet another embodiment of the present invention, before cassette backward conveyance.
Figure 55:
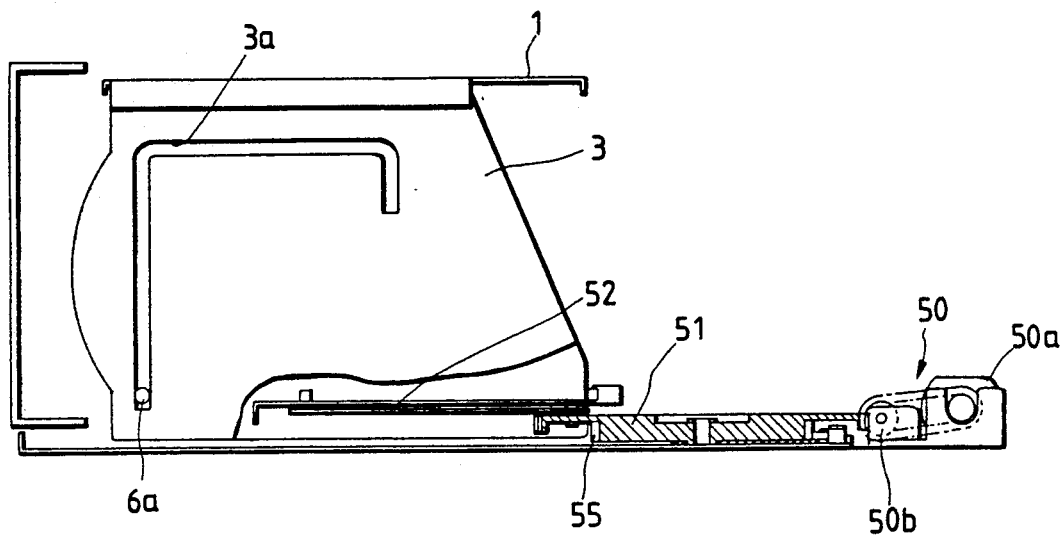
FIG. 55 shows a side view of the automatic changer shown in FIG. 54 before cassette backward conveyance.
Figure 56:
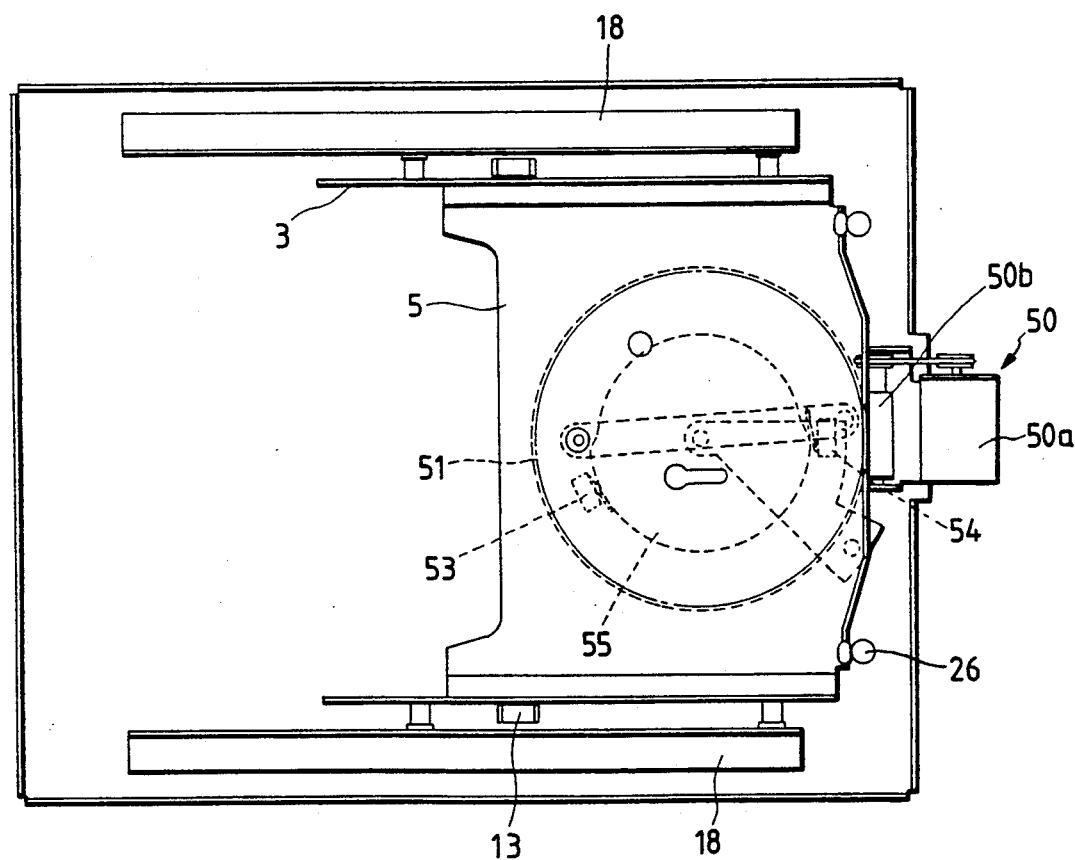
FIG. 56 shows a side view of the automatic changer shown in FIG. 54, after cassette backward conveyance.
Figure 57:
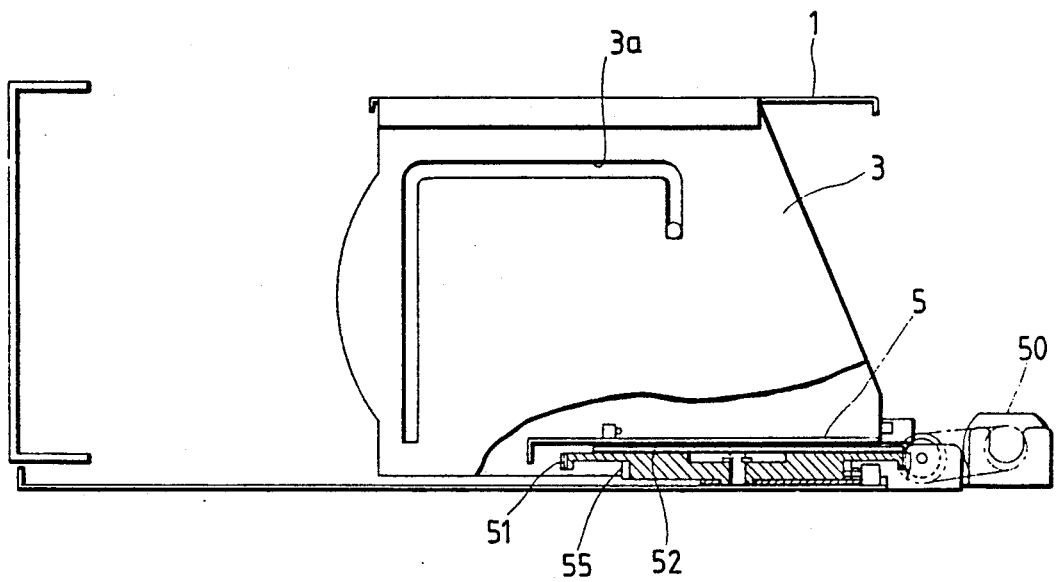
FIG. 57 shows a side view of the automatic changer shown in FIG. 54, after cassette backward conveyance.

Yet another embodiment of the present invention, which is an automatic changer for a digital audio cassette tape player, is described with reference to FIG. 53 from now on. Although the rotary encoder 20 for detecting the rotative angle of the mover 17 is used in each of the preceding embodiments, to find out that the catcher 27 or 40 reaches a prescribed position on the holder 6, reflection surfaces 4h are provided on the inside of the rear portion of a slider 4 to correspond to the respective vertical positions of a holder 6 and a catcher 27 or 40 is provided with a light detector 41 on a surface facing the reflection surfaces in the present embodiment, instead. The reflection surface 4h is found out by the light detector 41 on the catcher 27 or 40 moved up or down along the rotation of a mover 17, to control the rotation of a moving unit 19.

Yet another embodiment of the present invention, which is an automatic changer for a digital audio cassette tape player, is described with reference to FIGS. 54 through 62 from now on. Although the base plate 5 is moved backward and forward through the engagement of the rack 22 and the drive gear 11b of the drive unit 11 and the position of the base plate is found out by the detection switches 23 and 24 in the most preceding embodiment, a gear 51 engaged with the worm 50b of a drive unit 50 having a motor 50a, an arm 52 coupling the gear to a base plate 5, and a cam 55, which is rotated together with the gear to operate two detection switches 53 and 54, are provided in the present embodiment, instead. When guide pins 6a are in positions shown in FIG. 55, in the state of the automatic changer shown in FIGS. 54, 55 and 58, the detection switch 53 is off and the other detection switch 54 is on.

Figure 58:
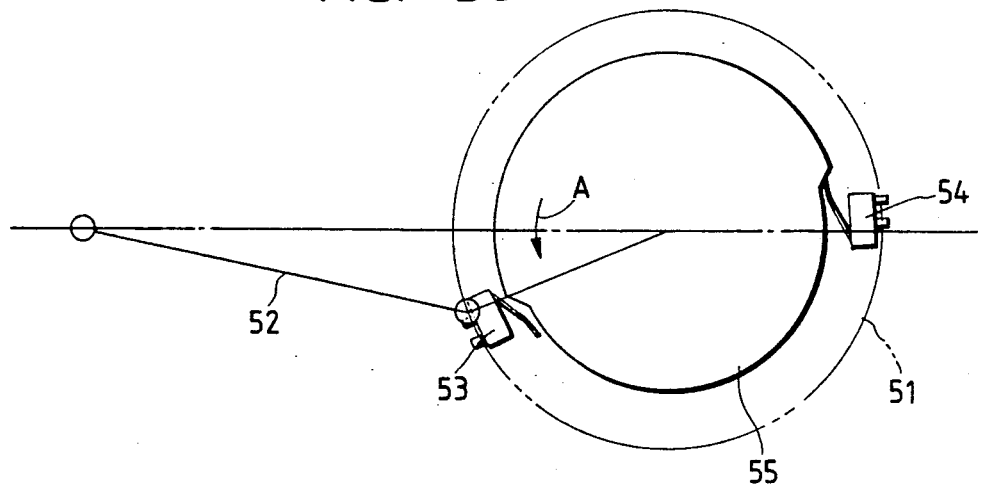
FIG. 58, 59, 60, 61 and 62 show simplified plan views for describing the operation of the automatic changer shown in FIG. 54.
Figure 59:
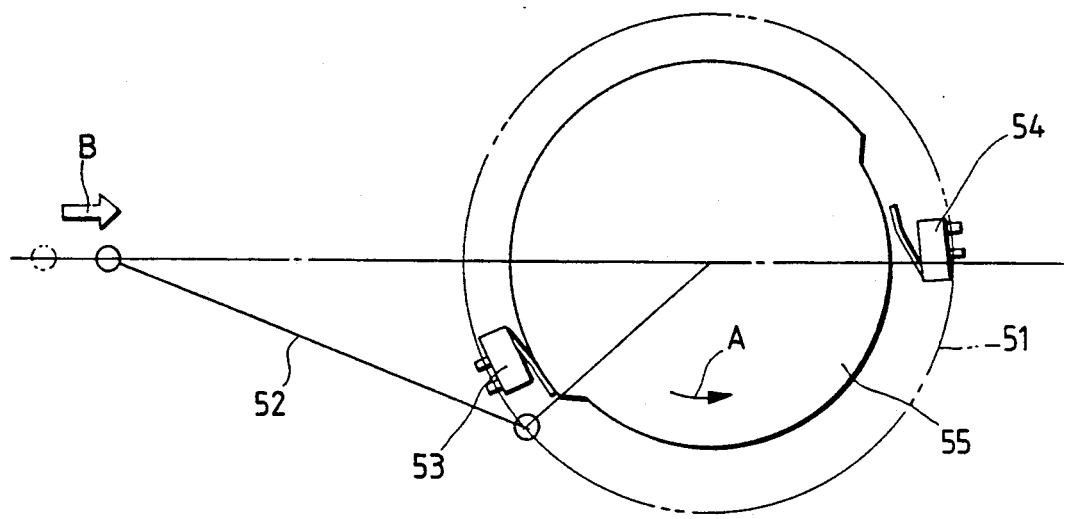
Figure 60:
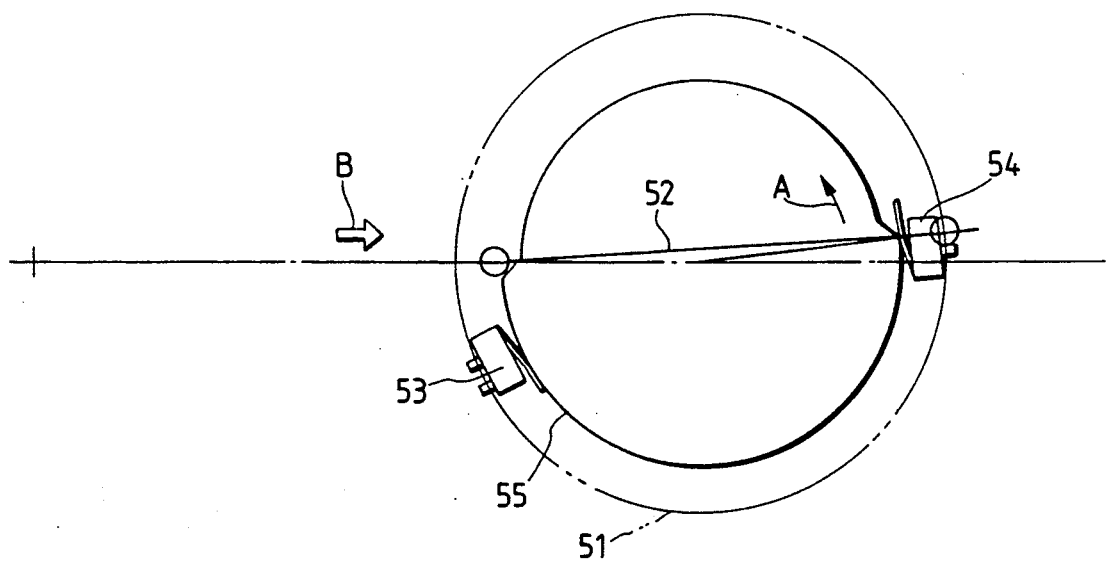

When the catchers 27 or 40 of the automatic changer shown in FIGS. 54 through 62 are to be operated to pull out a holder 6 retaining a cassette, from guide slits 7c, the drive unit 50 is put into action so that the gear 51 and the cam 55 are rotated in a direction A shown in FIG. 58. As a result, the base plate 5 starts being moved backward, as shown by an arrow 59 in FIG. 59, because of being pulled by the arm 52. At that time, the detection switch 53 is turned on to indicate that the gear 51 is in action, but the other detection switch 54 is turned off. When the backward movement of the baseplate 5 is completed, the detection switch 54 is turned on as shown in FIG. 60, to indicate the completion of the backward movement of the base plate to put the drive unit 50 out of action, but the other detection switch 53 remains turned on.

Figure 61:
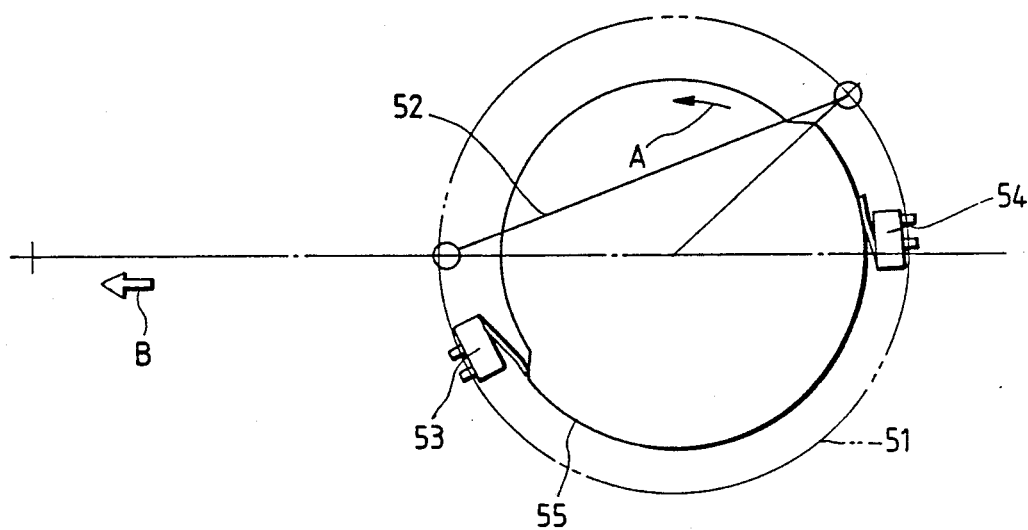
Figure 62:
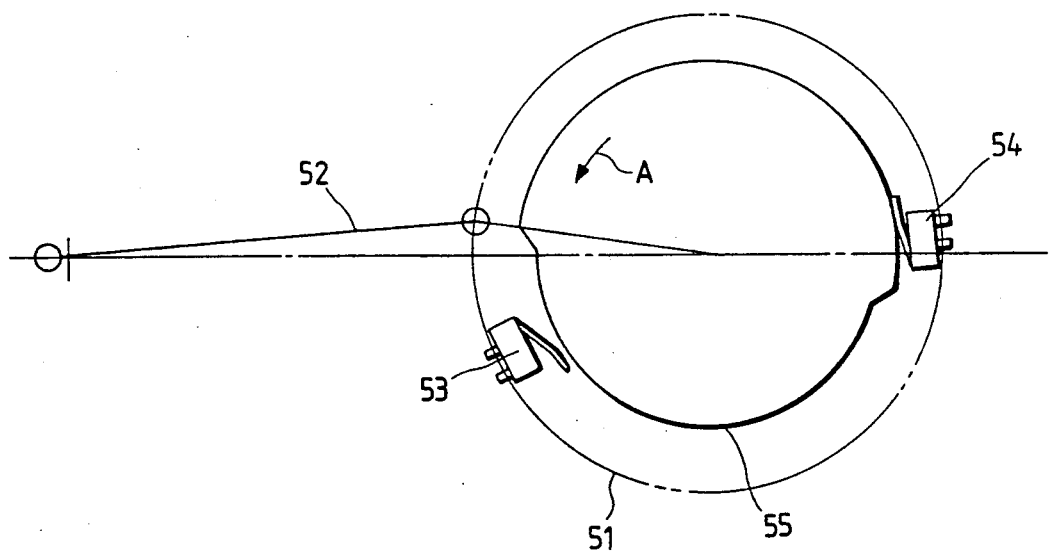

When the holder 6 is to be returned to the guide slits 7c, the gear 51 is rotated in the same direction A by the drive unit 50 as shown in FIG. 61, so that the base plate 5 is moved in a direction B shown therein. At that time, the detection switch 54 remains turned on, but the other detection switch 53 is turned off. The automatic changer is then put in a state shown in FIG. 62, and is there after put in another state shown in FIG. 58k, so that the base plate 5 is slightly moved backward from the most forwardly moved position thereof and the operation of the catchers 27 or 40 in returning the cassette from the tape running mechanism of the tape player is completed. At that time, the detection switch 54 is turned off to put the drive unit 50 out of action, but the other detection switch 53 remains turned off. The drive unit 50 is thus controlled through turning on and off the detection switch 54, in this embodiment. If power is lost during the rotation of the drive unit 50, the position of the base plate 5 and the direction of movement thereof are found out in terms of the turned-on and turned-off states of both the detection switches 53 and 54 to determine the operation of the automatic changer when the power is restored. As for this embodiment, the operation a efficiency of the automatic changer in an intermediate position wherein a high moving speed is required and in an initial and a final positions wherein a strong pushing force is required can be made higher.

According to the present invention, tape cassettes can be loaded in a tape player without using a magazine as in a conventional art. For that reason, a space does not need to be provided for the magazine. Therefore, the size and weight of the tape player can be reduced.

Since the back labels of the tape cassettes loaded in the tape player can be seen through from the front of the player except for that of the tape cassette being played, the contents of the tape cassettes can be always recognized without memorizing them beforehand. It is thus prevented to play a wrong tape cassette. Besides, the tape cassettes can be pulled out from holding means and replaced with other during playback and during non-play back except for the tape cassette being played.

Since the loading of each tape cassette acts to that the slider of the cassette is cassette, a mechanism for causing the cassette slider to slide during the conveyance of the tape cassette does not need to be provided. Therefore, the constitution of equipment is simplified.

Since it is found out by detection means whether the holding means retaining the tape cassette is separated from a support means or returned thereto, to control the operation of a drive means the operation can be precisely performed. Even if electric power is lost during the setting, returning or the like of the tape cassette, the direction of the operation of the drive means can be regulated on the basis of the states of the detection means when the electric power is restored.

When the holding means is returned back to the guide groove from the play condition, the guide pin of the holding means is introduced into the guide groove by the enlarged taper portion. At this time, the catcher is moved in the direction perpendicular to the guide groove. In contrast, since the worm driving the loading arm may be moved in the axial direction against the biasing force of the biasing member, in spite of the fact that the worm is not rotated, it is possible to rotate the loading arm. Therefore, the movement of the catcher due to the introduction of the guide pin into the enlarged taper portion is possible. There is no inadvertent effect such as clinch in the returning operation of the holding means to the guide groove.

Also, according to the present invention, since during the loading state of the cassettes, the guide pin of the holder is inserted into the guide grooves and is locked by the lock lever, the holder is not moved during the cassette loading operation and it is easy to load the cassette to the apparatus.

In addition, the lock lever is released by the cam surface, and the engagement portion of the catcher retains the guide pin. Therefore, the delivery of the catcher from the guide groove to the catcher may be performed without fail.

According to the actuation of the loading arm, the catcher and the holder are moved along the guide hole for setting the tape cassette to the tape travelling mechanism.

Therefore, it is unnecessary to use any magazine and it is possible to directly load the tape cassette to the tape player. In no play condition, even in the play mode, it is possible to load or unload the tape cassettes except for the played cassette.

As discussed above, the door provided at the front face of the insertion opening would not be closed if the cassette would be inserted with misalignment. Therefore, since the detection switch is not effected, the control means does not work the loading means. As a result, the tape cassette is moved to an undesirable or inaccurate position. There is a fear that the cassette would fall down on mid way and would be clinched with any other parts. According to the present invention, it is possible to overcome these defects.

If a foreign matter is inserted into the insertion opening upon the eject operation of the loading means for returning the cassette to the insertion opening, the detection switch would not be effected. As a result, the loading means will not perform the eject operation with the control means. Thus, the tape cassette would be collided against the foreign matter. According to the present invention, this disadvantage may be overcome.

The catcher for pulling the holding means away from the guide groove and returning the holding means to the guide groove is moved in parallel with the guide groove. Therefore, the catcher needs large forces at the initial stage for releasing the holding means. However, in the intermediate stage, the catcher does not need large forces but needs a speed for performing the operation in a short period of time.

The moving means connected to the catcher is connected to the gear through the arm. The motion is performed along the sine curve to attain the above-noted requirements.

The detection switch is operated by the cam in cooperation with the gear. Therefore, it is possible to perform the exact control by controlling the operation of the drive means with the output of the detection switch. Furthermore, by using the two detection switches, it is possible to detect the direction of the reciprocating movement of the catcher.

We claim:

1. An automatic changer for a digital audio cassette tape player, comprising:
   a plurality of holding means (6) for holding a plurality of tape cassettes, each cassette being inserted into an individual insertion opening with a lid of said tape cassette being located inwardly so that a label on each of said tape cassettes can be seen from a front side of said player;
   support means (7) for supporting said holding means;
   a tape conveying mechanism for conveying a selected one of said tape cassettes to and from said tape player;
   conveying means for picking up selectively one of said plurality of holding means, separating said one holding means away from said support means, and setting the selected cassette held in said one holding means onto said tape conveying mechanism with the selected cassette being held by said holding means; and
   moving unit drive means (19) for driving said conveying means so that the selected cassette is loaded onto said cassette tape player.

2. The automatic changer according to claim 1, further comprising slide means for engaging with a cassette slider disposed on each of said cassettes upon the insertion of each of said cassettes, releasing a lock provided on each of said cassettes and sliding said cassette slider, said slide means being provided in each of said plurality of holding means.

3. The automatic changer of claim 1 further comprising:
   detecting means for detecting a position where said one selected holding means is separated from said support means, and a position where said one selected holding means is returned back to said support means;
wherein said moving unit drive means (19) drives said conveying means in accordance with the detection of said detecting means.

4. An automatic changer for a digital audio cassette tape player, comprising:
a plurality of holders (6) for holding a plurality of tape cassettes, said plurality of holders each including guide pins (6a);
a plurality of guide means for guiding said plurality of holders (6), said plurality of guide means (7) each including a pair of elongate slots (7c) extending in a forward direction for receiving said guide pins (6a) and a pair of lock levers (7a), said lock levers engaging said guide pins (6a) so as to secure said holders (6) in said slots (7c);
a pair of catchers (27) disposed on opposing sides of said holders (6), said guide pins (6a) engaging said catchers;
moving means (17) coupled to said catchers for moving the catchers in a transverse direction perpendicular to said forward direction; and
a moving unit drive means (19) for driving said moving means, said moving unit drive means (19) including a worm gear (19c) and an urging means (19f) for urging said worm gear in an axial direction with respect thereto, so that a selected cassette is loaded onto said cassette tape player.

5. An automatic changer for a digital audio cassette tape player, comprising:
a plurality of holding means (6) for holding a plurality of tape cassettes inserted into insertion openings;
a plurality of guide means (7) each including a pair of elongate slots (7c) extending in a forward direction into which each holding means is inserted;
a pair of catchers (27) moving in a direction perpendicular to said forward direction of said guide means for gripping a selected one of said holding means;
rotatable moving means (17) coupled with said catchers (27) for moving said catchers (27) in said forward direction, parallel with said slots; and
detection means rotatably coupled to said moving means for detecting an angular position of said moving means and attendantly the position of said catchers, so that a selected cassette is loaded onto said cassette tape player.

6. An automatic changer for a digital audio cassette tape player, comprising:
a plurality of holding means for holding in place a plurality of tape cassettes inserted from insertion openings;
guide means for supporting said holding means to be engageable or disengageable with said guide means;
catchers for conveying a selected one of said holding means away from said guide means so that a selected cassette is loaded onto said cassette tape player; and
preventing members mounted on one side of said guide means for preventing the insertion of the cassette tape into said guide means.

7. An automatic changer for a digital audio cassette tape player, comprising:
a plurality of holders (6) for holding a plurality of tape cassettes, said plurality of holders each including guide pins (6a);
a plurality of guide means (7) for guiding said plurality of holders (6), said plurality of guide means (7) each including a pair of elongate slots (7c) extending in a forward direction for receiving said guide pins (6a) and a pair of lock levers (7a) each provided with a pin (7e), said lock levers engaging said guide pins (6a) so as to secure said holders (6) in said slots (7c);
cam means (27t) for contacting said lock lever pins (7e) so as to disengage said lock levers (7a) from said guide pins (6a);
a pair of catchers (27) having engagement portions (27s) for receiving and engaging with said guide pins (6a) of a corresponding one of said plurality of holders, said catchers having a support shaft extending therefrom;
catcher guide means (2, 3, 4) for guiding said catchers, said catcher guide means having slots for receiving said support shaft; and
a moving means (17) engaged with said support shaft (27a) of said catchers (27) for moving said support shaft along said slots to thereby move the catchers so that a selected cassette is loaded onto said cassette tape player.

* * * * *